US011002365B2

United States Patent
Inagaki

(10) Patent No.: US 11,002,365 B2
(45) Date of Patent: May 11, 2021

(54) VALVE DEVICE

(71) Applicant: DENSO CORPORATION, Kariya (JP)

(72) Inventor: Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/388,921

(22) Filed: Apr. 19, 2019

(65) Prior Publication Data

US 2020/0003310 A1   Jan. 2, 2020

(30) Foreign Application Priority Data

Jun. 29, 2018   (JP) .............................. JP2018-123901

(51) Int. Cl.
*F16K 1/20* (2006.01)
*F16K 3/08* (2006.01)
*F16K 3/02* (2006.01)

(52) U.S. Cl.
CPC .............. *F16K 3/08* (2013.01); *F16K 1/205* (2013.01); *F16K 3/0227* (2013.01)

(58) Field of Classification Search
CPC ........ F16K 1/2042; F16K 1/205; F16K 1/226; F16K 1/2261; F16K 1/2014; F16K 1/223; F16K 1/46; F16K 39/028; F16K 5/0684
See application file for complete search history.

(56) References Cited

U.S. PATENT DOCUMENTS

| 4,681,326 A * | 7/1987 | Kubo ...................... F16J 9/12 |
| | | 277/447 |
| 5,201,490 A * | 4/1993 | Maraud .................. F16K 1/443 |
| | | 251/120 |
| 2009/0020099 A1 | 1/2009 | Bessho et al. |
| 2013/0341548 A1* | 12/2013 | Dehais .................... F16K 1/222 |
| | | 251/306 |
| 2017/0227130 A1 | 8/2017 | Kohlen et al. |

FOREIGN PATENT DOCUMENTS

| JP | 2016-211678 | 12/2016 |
| JP | 2016-211678 A * | 12/2016 |

* cited by examiner

*Primary Examiner* — Hailey K. Do
(74) *Attorney, Agent, or Firm* — Nixon & Vanderhye P.C.

(57) ABSTRACT

A valve member is movably provided in a fluid passage to open or close the same. A seal ring is movably assembled to a valve-side annular groove formed in an outer peripheral portion of the valve member. A fluid escape portion is formed on a downstream-side ring surface of the seal ring. A recessed portion is formed as the fluid escape portion and located at a radial-inside position of a sealing surface portion, which is a part of the downstream-side ring surface and tightly in contact with a downstream-side groove surface of the valve-side annular groove when the valve member is moved to a valve closed position. Fluid flows from an upstream side to a downstream side through the fluid escape portion when the valve member is moved to a valve opened position, so that the seal ring is prevented from coming out from the valve-side annular groove.

9 Claims, 28 Drawing Sheets

VALVE DEVICE

CROSS REFERENCE TO RELATED APPLICATION

This application is based on Japanese Patent Application No. 2018-123901 filed on Jun. 29, 2018, the disclosure of which is incorporated herein by reference.

FIELD OF TECHNOLOGY

The present disclosure relates to a valve device for opening and closing a fluid passage through which gas flows.

BACKGROUND

A valve device is known in the art, according to which a fluid passage for gas is opened or closed by a valve member which is movably accommodated in the fluid passage and rotated therein. A valve device according to one of prior arts has a sealing structure for sealing a gap between an outer periphery of a valve member and an inner peripheral surface of a fluid passage when the valve member is in a valve closed position. In the sealing structure, a seal ring made of resin and formed in a C-letter shape is movably fitted into an annular groove formed at the outer periphery of the valve member.

In the valve device of the above prior art, however, the seal ring may come out from the annular groove of the valve member when the valve member is moved from the valve closed position to a valve opened position. This is because the seal ring is expanded in a radial-outward direction by pressure of the gas flowing into the annular groove. Since stiffness of the seal ring made of the resin becomes lower at a high temperature, the seal ring may be easily deformed by the pressure of the gas flowing into the annular groove. When compared the seal ring made of the resin with a seal ring made of metal, the seal ring made of the resin may more easily come out from the annular groove. It is, therefore, necessary to effectively prevent the seal ring, which is movably fitted into the annular groove of the valve member, from easily coming out from the annular groove. This point is applied not only to the seal ring made of the resin but also to the seal ring made of the metal.

SUMMARY OF THE DISCLOSURE

The present disclosure is made in view of the above point. It is an object of the present disclosure to provide a valve device, according to which a seal ring does not easily come out or drop out from a valve member when the valve member is moved to a valve opened position.

According to one of features of the present disclosure, a valve device comprises;

a valve member movably accommodated in a fluid passage for opening and closing the fluid passage;

a seal ring provided at an outer peripheral portion of the valve member for sealing a gap between the valve member and the fluid passage when the valve member is moved to a valve closed position; and a fluid escape portion formed either in the valve member or in the seal ring at such a position that fluid is not allowed to flow from an upstream side to a downstream side of the valve member through the fluid escape portion when the valve member is moved to a valve closed position but the fluid is allowed to flow from the upstream side to the downstream side through the fluid escape portion when the valve member is moved to a valve opened position.

According to the above structure, since the fluid can flow from the upstream side to the downstream side through the fluid escape portion when the valve member is moved to the valve opened position, fluid pressure of the fluid flowing into an annular groove formed either in the valve member or in the seal ring and pushing the seal ring in a radial-outward direction can be made smaller. It is thereby possible to prevent the seal ring from being expanded in the radial-outward direction and to prevent the seal ring from coming out or dropping out from the annular groove of the valve member.

BRIEF DESCRIPTION OF THE DRAWINGS

The above and other objects, features and advantages of the present disclosure will become more apparent from the following detailed description made with reference to the accompanying drawings. In the drawings:

FIG. 2 is a schematically-enlarged cross-sectional view showing relevant portions of the valve device according to a first embodiment of the present disclosure, wherein FIG. 2 shows the cross-sectional view taken along a line II-II in FIG. 3 in a valve closed condition;

DETAILED DESCRIPTION OF THE EMBODIMENTS

Figure 1:
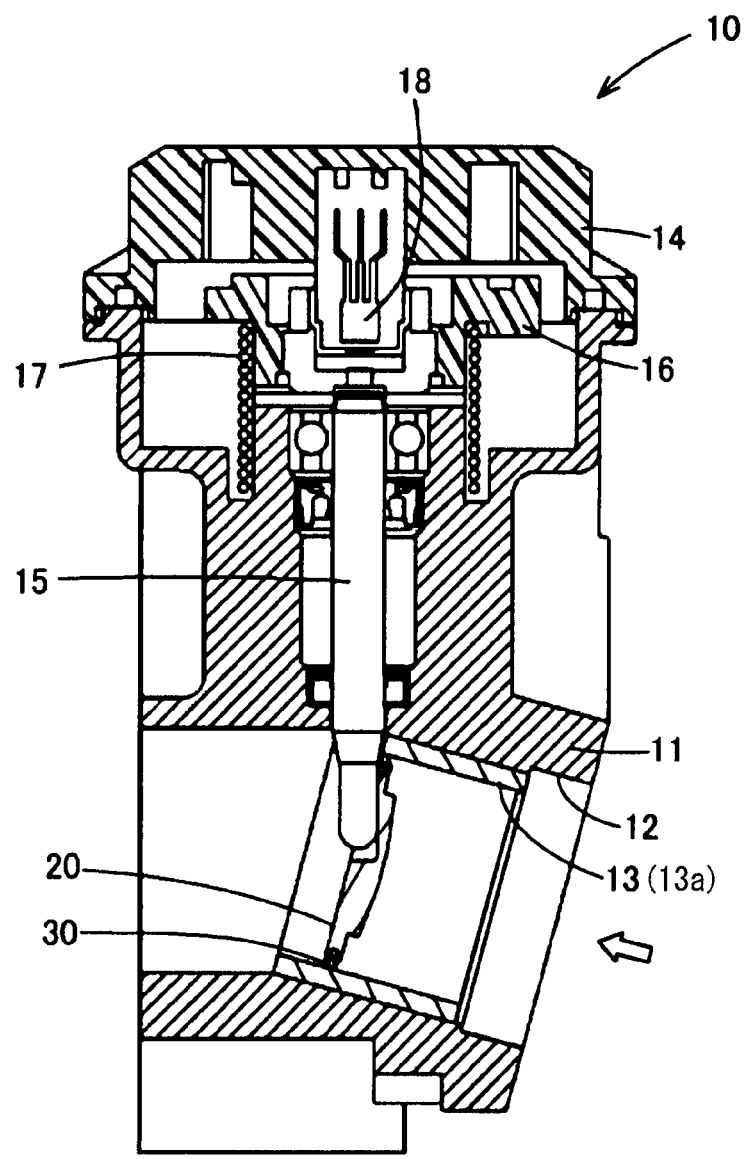
FIG. 1 is a schematic cross-sectional view showing a general structure of a valve device, to which the present disclosure is applied.

The present disclosure will be explained hereinafter by way of multiple embodiments and/or modifications with reference to the drawings. The same reference numerals are given to the same or similar structures and/or portions in order to avoid repeated explanation.

First Embodiment

A valve device 10, to which the present disclosure is applied, will be explained with reference to FIG. 1. The valve device 10 includes a fluid passage 12 through which gas flows, which is opened and closed by a rotational movement of a valve member 20. The valve device 10 is provided, for example, in an exhaust system of an internal combustion engine (hereinafter, the engine; not shown) and applied to an exhaust gas recirculation device (hereinafter, the EGR device) for controlling an amount of exhaust gas (which is also referred to as an EGR gas) to be re-circulated into an intake system of the engine through an EGR passage (the fluid passage 12). As above, the valve device 10 recirculates a part of the exhaust gas from an exhaust-gas passage to an intake-air passage of the engine as the EGR gas. The valve device 10 has a structure shown in FIG. 1.

The valve device 10 has a valve housing 11, a sensor casing 14 and so on.

The valve housing 11 is made of metal, such as, aluminum alloy by a die-casting method. The valve housing 11 has in its inside the fluid passage 12, through which the EGR gas flows from the exhaust-gas passage to the intake-air passage of the engine. A nozzle member 13 is fixed to an inner wall surface of the fluid passage 12. The nozzle member 13 is made of metal, for example, stainless steel (such as, SUS), which has high heat resistance and high corrosion resistance. An inner peripheral surface 13a of the nozzle member 13 forms a part of the inner wall surface of the fluid passage 12. The valve housing 11 movably supports the valve member 20 in such a manner that the valve member 20 is rotated in the fluid passage 12 in order to adjust an opening degree of the valve member 20. The valve housing 11 accommodates an electric motor for rotating the valve member 20. For the purpose of simplicity, the electric motor is not shown in FIG. 1.

The valve member 20, which is connected to the electric motor (not shown) via a shaft 15, is movably accommodated in the nozzle member 13. The valve member 20 is a so-called butterfly-type valve having a disc shape. The valve member 20 changes an opening area of the nozzle member 13 (an opening area of the fluid passage 12) depending on a rotational position of the shaft 15. Namely, the valve member 20 is rotated together with the shaft 15 to adjust its opening degree in the nozzle member 13 of the fluid passage 12. The valve member 20 is made of metal, such as, the aluminum alloy, the stainless steel (SUS) or the like, or may be made of resin, such as, PPS (Polyphenylene Sulfide), PTFE (Polytetrafluoroethylene), PEEK (Polyetheretherketone) or the like.

The valve member 20 is connected to the electric motor via a speed reducing mechanism having multiple gears. In other words, rotational torque of the electric motor is increased through the speed reducing mechanism and transmitted to the valve member 20. More exactly, the speed reducing mechanism is composed of a motor gear (not shown) integrally rotated with the electric motor, an intermediate gear (not shown) to be rotated by the motor gear, and a final-stage gear 16 rotated by the intermediate gear. Rotational speed of the electric motor is reduced by a combination of those gears. The shaft 15 is integrally rotated with the final-stage gear 16.

A return spring 17 is provided in the valve device 10 for biasing the valve member 20 in a valve closing direction. The return spring 17 is composed of a single coil spring, wherein a coil spring is wound only in one direction. The return spring 17 is coaxially arranged with the shaft 15 at a position surrounding the shaft 15. The return spring 17 is assembled at a position between the valve housing 11 and the final-stage gear 16 in order to generate a biasing force for biasing the valve member 20 only in the valve closing direction. As above, the final-stage gear 16 and its related parts are rotated against the spring biasing force of the return spring 17.

The sensor casing 14 is made of resin and accommodates a sensor 18 for detecting the opening degree of the valve member 20. The sensor 18 is composed of, for example, a contactless type position sensor for detecting the opening degree of the valve member 20 based on detection of a rotational angle of the shaft 15. A flanged portion of the sensor casing 14 is fitted to a flanged portion of the valve housing 11 and they are firmly fixed to each other by screws.

Figure 2:
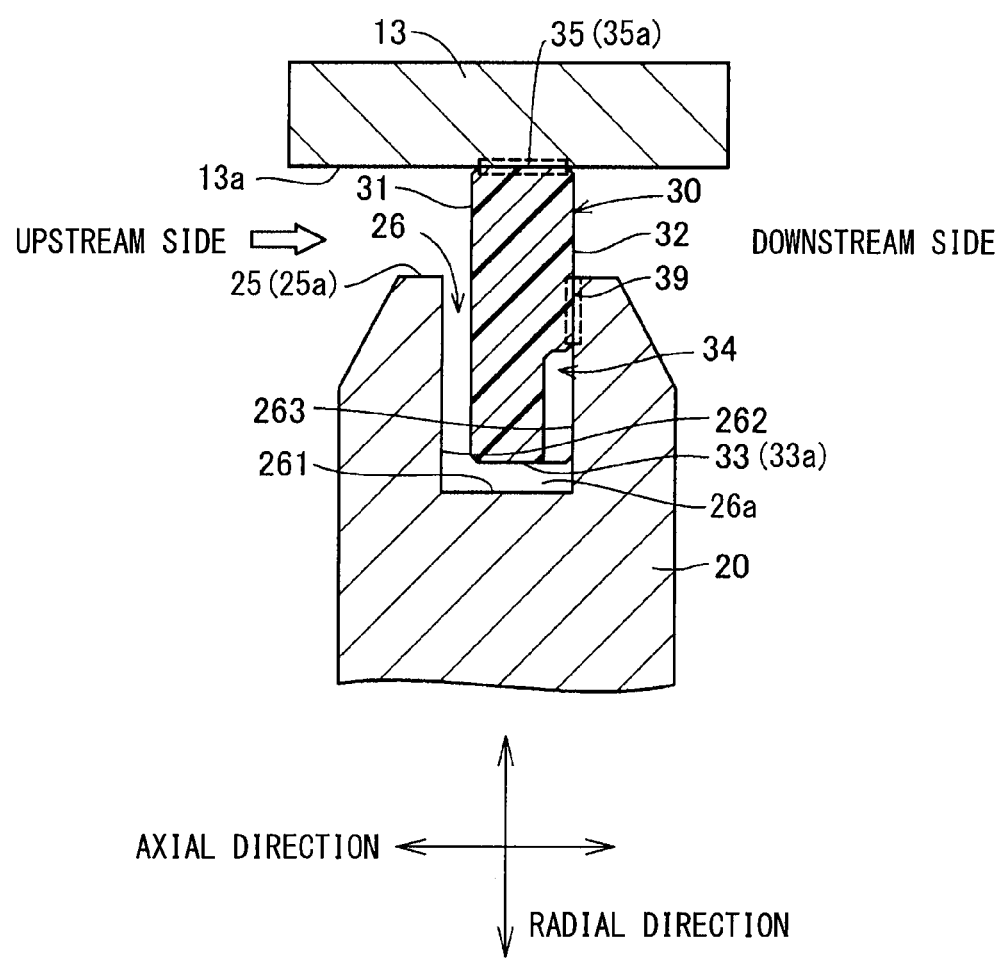

As shown in FIG. 2, a valve-side annular groove 26 is formed in an outer peripheral portion 25 of the valve member 20 in its entire circumferential direction. A seal ring 30 is fitted into the annular groove 26. The seal ring 30 seals a gap between the outer peripheral surface 25a of the valve member 20 and the inner peripheral surface 13a of the nozzle member 13, when the valve member 20 is in its valve closed position. More exactly, an outer peripheral portion 35 of the seal ring 30 is protruded in a radial-outward direction from an outer peripheral surface 25a of the outer peripheral portion 25 of the valve member 20, while an inner peripheral portion 33 of the seal ring 30 is inserted into the annular groove 26 in a radial-inward direction.

Figure 3:
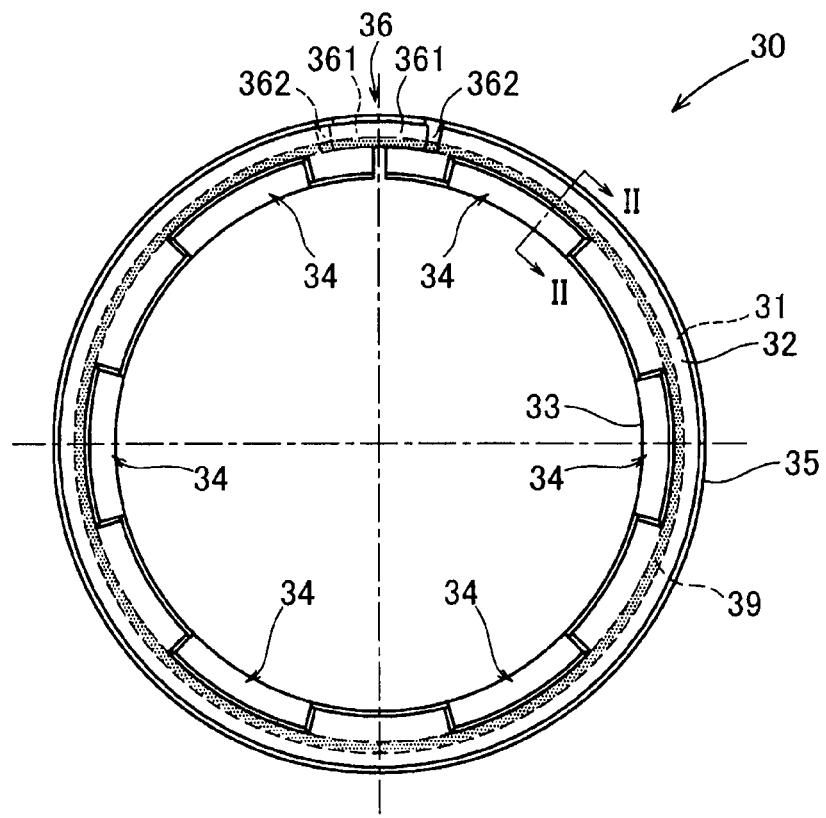
FIG. 3 is a schematic front view of a seal ring according to the first embodiment.
Figure 4:
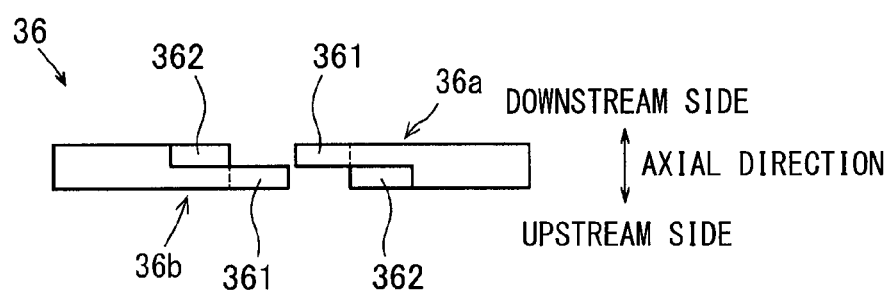
FIG. 4 is a schematic top plane view showing a fitting portion of the seal ring of the first embodiment.

As shown in FIGS. 3 and 4, the seal ring 30 is formed in a flat-plate ring shape. The seal ring 30 is made of the resin, such as, PPS, PTFE, PEEK and so on.

FIG. 3 shows the seal ring 30 when viewed it in an axial direction from a downstream side to an upstream side in FIG. 2. In FIG. 3, a one-dot-chain line in a horizontal direction and another one-dot-chain line in a vertical direction cross over at right angle on a cross point, which corresponds to a point on a center axis line of the seal ring 30 and the valve member 20. FIG. 2 shows a cross section of the seal ring 30 and a part of the valve member 20 (including the outer peripheral portion 25) on a plane taken along a line II-II in FIG. 3. A left-hand side in FIG. 2 is the upstream side, while a right-hand side is the downstream side.

As shown in FIGS. 3 and 4, a fitting portion 36 is formed in the seal ring 30, so that the seal ring 30 can be elastically expanded in the radial-outward direction (in a diameter expanding direction). Each of circumferential ends 36a and 36b of the seal ring 30 at the fitting portion 36 is separated from each other in the circumferential direction. In other words, a diameter of the seal ring 30 can be expanded, when the seal ring 30 is assembled to the annular groove 26 of the valve member 20. The diameter of the seal ring 30 is reduced thereafter, so that the seal ring 30 is inserted into and accommodated in the annular groove 26 of the valve member 20.

As shown in FIGS. 3 and 4, a projecting portion 361 and an accommodation portion 362 are formed at each circumferential end 36a/36b of the seal ring 30. The projecting portion 361 formed at one of the circumferential ends (for example, a right-hand end 36a) is projected in the circumferential direction of the seal ring 30 toward the other circumferential end (a left-hand end 36b), while the accommodation portion 362 formed at the one circumferential end (the right-hand end 36a) accommodates the projecting portion 361 of the other circumferential end (the left-hand end 36b). According to the above structure, the seal ring 30 is inserted into the annular groove 26 entirely in the circumferential direction. In other words, as shown in FIG. 3, the circumferential ends 36a and 36b of the fitting portion 36 (the projecting portions 361 and the accommodation portions 362) overlap with each other not only in the circumferential direction but also in the axial direction and a radial direction, when the valve member 20 is in the valve closed position. The shape of the fitting portion 36 is shown in FIGS. 3 and 4 as one of examples but is not limited to the shape of the drawings. The shape of the fitting portion 36 can be modified in various manners, so long as each circumferential end 36a overlaps with the other circumferential end 36b in the circumferential direction, in the axial direction and in the radial direction.

As shown in FIG. 2, the seal ring 30 is pushed in the axial direction to the downstream side by a pressure difference generated between fluid pressure at the upstream side and fluid pressure at the downstream side of the valve member 20, when the valve member 20 is in the valve closed position. In a valve closed condition, a part 39 of a downstream-side ring surface 32 (hereinafter, an axial-side sealing surface portion 39) of the seal ring 30 is tightly in contact with a downstream-side groove surface 263 of the valve-side annular groove 26. Therefore, in the valve closed condition, a fluid flow from the upstream side to the downstream side through a radial-inside space 26a formed in the annular groove 26 between the inner peripheral portion 33 of the seal ring 30 and a groove bottom portion 261 of the annular groove 26 is cut off. The fluid pressure in the radial-inside space 26a between the inner peripheral portion 33 and the groove bottom portion 261 is thereby increased.

In a process that the valve member 20 is moving to the valve closed position, the fluid flows through a radial-outside space between an outer peripheral surface 35a of the outer peripheral portion 35 of the seal ring 30 and the inner peripheral surface 13a of the nozzle member 13. Fluid pressure at the radial-outside space is thereby decreased. As a result, the seal ring 30 is expanded in the radial-outward direction by the pressure difference between the fluid pressure in the radial-inside space 26a of the annular groove 26 (on the side of the inner peripheral portion 33) and the fluid pressure in the radial-outside space between the outer peripheral surface 35a of the seal ring 30 and the inner peripheral surface 13a of the nozzle member 13 (on the side of the outer peripheral portion 35). Therefore, the outer peripheral surface 35a of the outer peripheral portion 35 of the seal ring 30 is tightly in contact with the inner peripheral surface 13a of the nozzle member 13, when the valve member 20 is moved to the valve closed position. The outer peripheral surface 35a works as a sealing surface and it is also referred to as a radial-side sealing surface portion 35a.

According to the above structure, not only the axial-side sealing surface portion 39 of the seal ring 30 is tightly in contact with the downstream-side groove surface 263 of the annular groove 26 of the valve member 20 in the axial direction, but also the radial-side sealing surface portion 35a of the seal ring 30 is tightly in contact with the inner peripheral surface 13a of the nozzle member 13 in the radial direction. As above, a radial gap between the valve member 20 and the nozzle member 13 is sealed by the seal ring 30, when the valve member 20 is moved to the valve closed position.

In the above process that the valve member 20 is moving to the valve closed position, the seal ring 30 is expanded in the radial-outward direction and each of the circumferential ends 36a and 36b at the fitting portion 36 is moved in the circumferential direction away from the other circumferential end. However, overlapping portions between both circumferential ends 36a and 36b are tightly brought into contact with each other in the axial direction and the radial direction by the pressure differences. Accordingly, it is possible to prevent the fluid from flowing from the upstream side to the downstream side through a gap to be formed at the fitting portion 36.

As shown in FIGS. 2 and 3, multiple recessed portions 34 are formed on the downstream-side ring surface 32 of the seal ring 30 and each of the recessed portions 34 is located at a radial-inside position of the axial-side sealing surface portion 39. Each of the recessed portions 34 is recessed in the axial direction from the downstream-side ring surface 32 and recessed in the radial-outward direction from an inner peripheral surface 33a of the inner peripheral portion 33. The multiple recessed portions 34 are arranged in the circumferential direction of the seal ring 30 at equal intervals. The recessed portions 34 are formed at circumferential-outside positions of the fitting portion 36, so that the recessed portion 34s located at positions distanced from the fitting portion 36 in the circumferential direction. In the present embodiment, six recessed portions 34 are formed. As explained below, the recessed portions 34 have a function for preventing the seal ring 30 from coming out in the radial-outward direction from the valve-side annular groove 26 of the valve member 20, when the valve member 20 is moved to the valve opened position.

Figure 6:
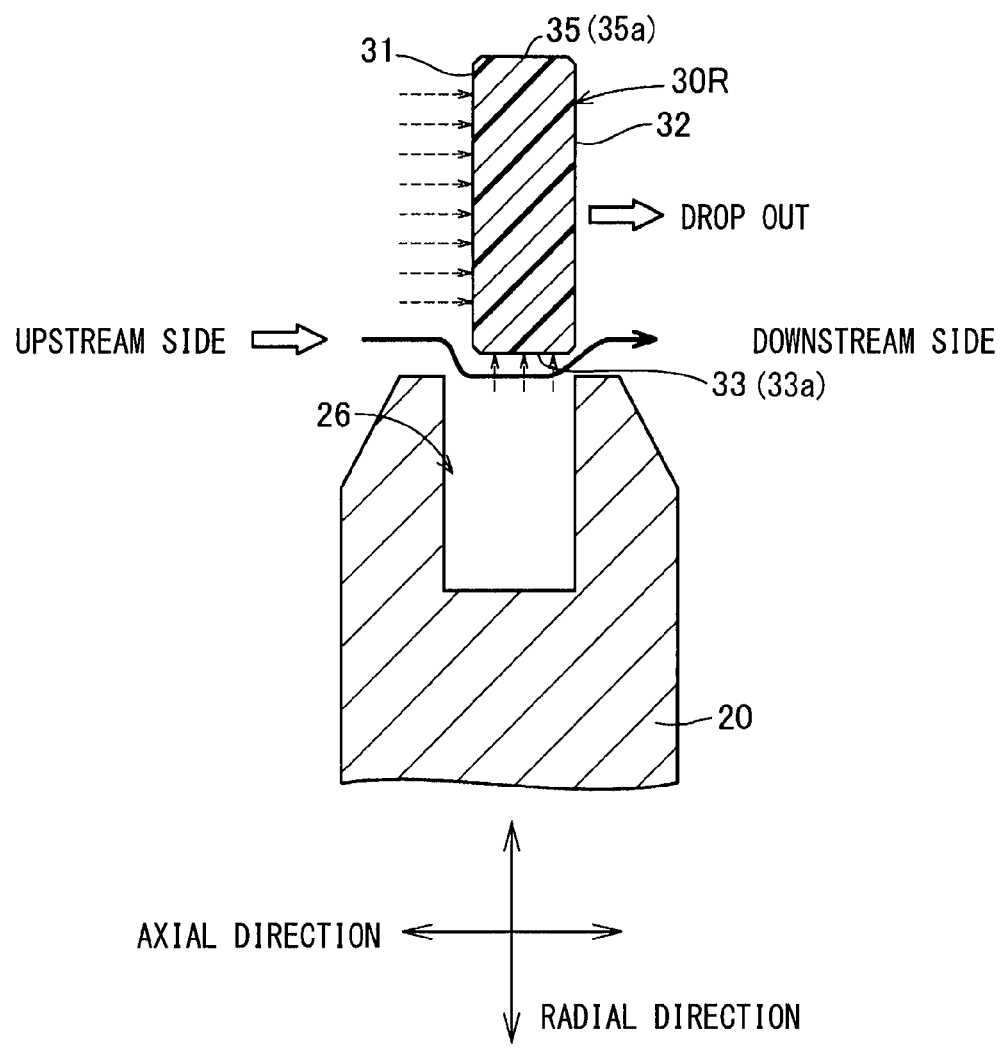
FIG. 6 is a schematic cross-sectional view for explaining an operation of a seal ring of a comparison example, when a valve member is in its valve opened position.

In a comparison example shown in FIG. 6, a seal ring 30R does not have a structure corresponding to the recessed portions 34 of the first embodiment. The seal ring 30R is expanded in the radial-outward direction by the pressure difference between the fluid pressure in the radial-inside space at the inner peripheral portion 33 and the fluid pressure in the radial-outside space at the outer peripheral portion 35 when the valve member 20 is moved to the valve opened position, because there is no restricting portion in a valve opened condition like the inner peripheral surface 13a of the nozzle member 13 in the valve closed condition. Then, the inner peripheral portion 33 of the seal ring 30R may possibly come out from the valve-side annular groove 26. If the seal ring 30R came out from the annular groove 26, a part of the seal ring 30R may be tucked into a gap between the valve member 20 and the nozzle member 13 and the valve device may become inoperative.

Figure 5:
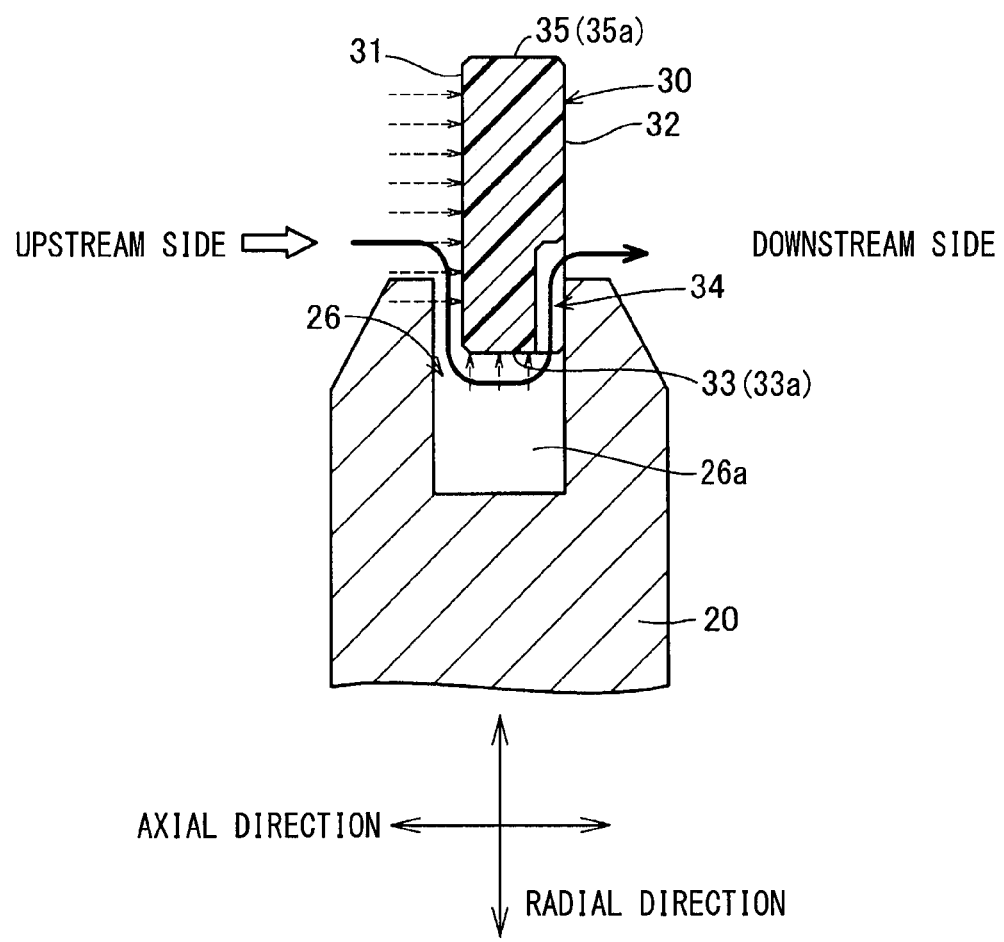
FIG. 5 is a schematic cross-sectional view for explaining an operation of the seal ring of the first embodiment, when a valve member is moved to a valve opened position.

On the other hand, as shown in FIGS. 2 to 5, the seal ring 30 of the present embodiment has the recessed portions 34. The recessed portions 34 are entirely accommodated in the annular groove 26 in the valve closed condition, as shown in FIG. 2, so that the fluid is not allowed to flow through the recessed portions 34. When the valve member 20 is moved to the valve opened position, the seal ring 30 is expanded in the radial-outward direction. Then, the recessed portions 34 are correspondingly moved in the radial-outward direction and a part of the recessed portions 34 comes out from the annular groove 26, as shown in FIG. 5. As a result, the fluid is allowed to flow from the upstream side to the downstream side through the radial-inside space 26a at the inner peripheral portion 33 and through the recessed portions 34, as indicated by an arrow of a solid line in FIG. 5. Accordingly, it is possible to prevent the increase of the fluid pressure in the radial-inside space 26a at the inner peripheral portion 33 of the seal ring 30 before the seal ring 30 comes out from the annular groove 26. In other words, the pressure difference between the radial-inside space 26a at the inner peripheral portion 33 and the radial-outside space at the outer peripheral portion 35 can be made smaller, to thereby prevent the seal ring 30 from coming out from the annular groove 26.

The recessed portion 34 corresponds to "a fluid escape portion" formed at a position adjacent to the inner peripheral portion 33 of the seal ring 30 (at the radial-inside position of the axial-side sealing surface portion 39), through which the fluid flows from the upstream side of the nozzle member 13 to the downstream side of the nozzle member 13 when the valve member 20 is moved to the valve opened position.

As explained above, the multiple recessed portions 34 are formed at equal intervals in the circumferential direction of the seal ring 30. It is thereby possible to equally decrease the fluid pressure in the radial-inside space 26a at the inner peripheral portion 33 along the circumferential direction and to thereby prevent the seal ring 30 from coming out in the radial-outward direction from the annular groove 26.

In addition, as explained above, the recessed portions 34 are formed at the circumferential-outside positions of the fitting portion 36, so that the recessed portions 34 are located at positions away from the fitting portion 36 in the circumferential direction. The fitting portion 36 is formed in order that the seal ring 30 can be expanded in the radial-outward direction. Therefore, stiffness of the fitting portion 36 is lower than that of the other portion of the seal ring 30. In a case that the recessed portion 34 was formed at the position of the fitting portion 36, the stiffness of the fitting portion 36 may become much lower. Then, the seal ring 30, in particular, the circumferential ends 36a and 36b, will be easily expanded in the radial-outward direction and thereby the seal ring 30 may more easily come out from the annular groove 26. In the above view point, it is preferable to form the recessed portions 34 at such positions (the circumferential-outside positions) separated from the fitting portion 36 in the circumferential direction.

On the other hand, since each of the circumferential ends 36a and 36b of the seal ring 30 at the fitting portion 36 is easily expanded in the radial-outward direction, the circumferential end 36a/36b corresponds to such a portion which may easily come out in the radial-outward direction from the annular groove 26. In this view point, it is preferable to form the recessed portion 34 at such a position closer to the fitting portion 36 in the circumferential direction to thereby decrease the fluid pressure in the annular groove 26 to be applied to the circumferential ends 36a and 36b as much as possible in the valve opened condition.

As a result, it is preferable to form the recessed portions 34 at the circumferential-outside positions of the fitting portion 36 in the circumferential direction but to locate one of the recessed portions 34 (a nearest recessed portion to the fitting portion 36) at such a position not in the fitting portion 36 but closer to the fitting portion 36 as much as possible. The nearest recessed portion may be formed at each circumferential side of the fitting portion 36. It becomes thereby possible not only to suppress the decrease of the stiffness of the seal ring 30 at the fitting portion 36 but also to prevent the seal ring 30 (in particular, the circumferential ends 36a and 36b) from coming out from the annular groove 26.

For example, it is preferable to locate each of the nearest recessed portions 34 at the circumferential-outside position of the fitting portion 36 in the circumferential direction but in such an angular range, which is smaller than 90 degrees from a reference line connecting the center axis of the seal ring 30 to the fitting portion 36. Furthermore, it is preferable to locate the nearest recessed portion 34 not only at the circumferential-outside position of the fitting portion 36 but also in another angular range smaller than 45 degrees from the reference line. Alternatively, it is further preferable to locate the nearest recessed portion 34 at the circumferential-outside position of the fitting portion 36 but in a further angular range smaller than 30 degrees from the reference line.

As explained above, the seal ring 30 is made of the resin. Therefore, it is possible to easily manufacture the seal ring 30 having the fitting portion 36 and the recessed portions 34 by resin material.

Second Embodiment

A valve device 10a of a second embodiment will be explained with reference to FIGS. 7 and 8. The second embodiment is different from the first embodiment in that the seal ring 30 of the first embodiment is replaced by a seal ring 30a.

Figure 7:
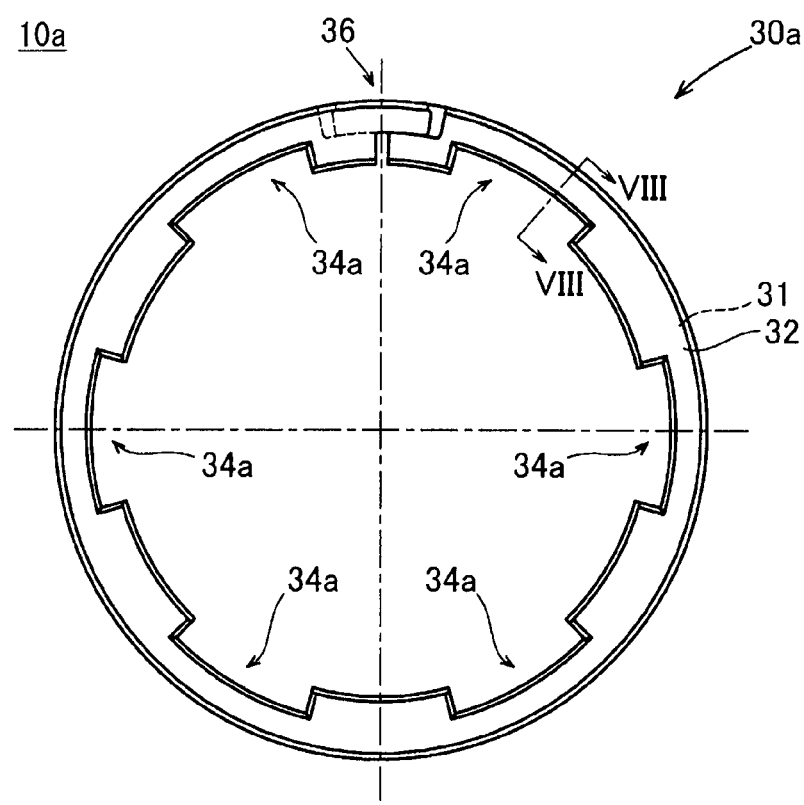
FIG. 7 is a schematic front view of a seal ring according to a second embodiment of the present disclosure.
Figure 8:
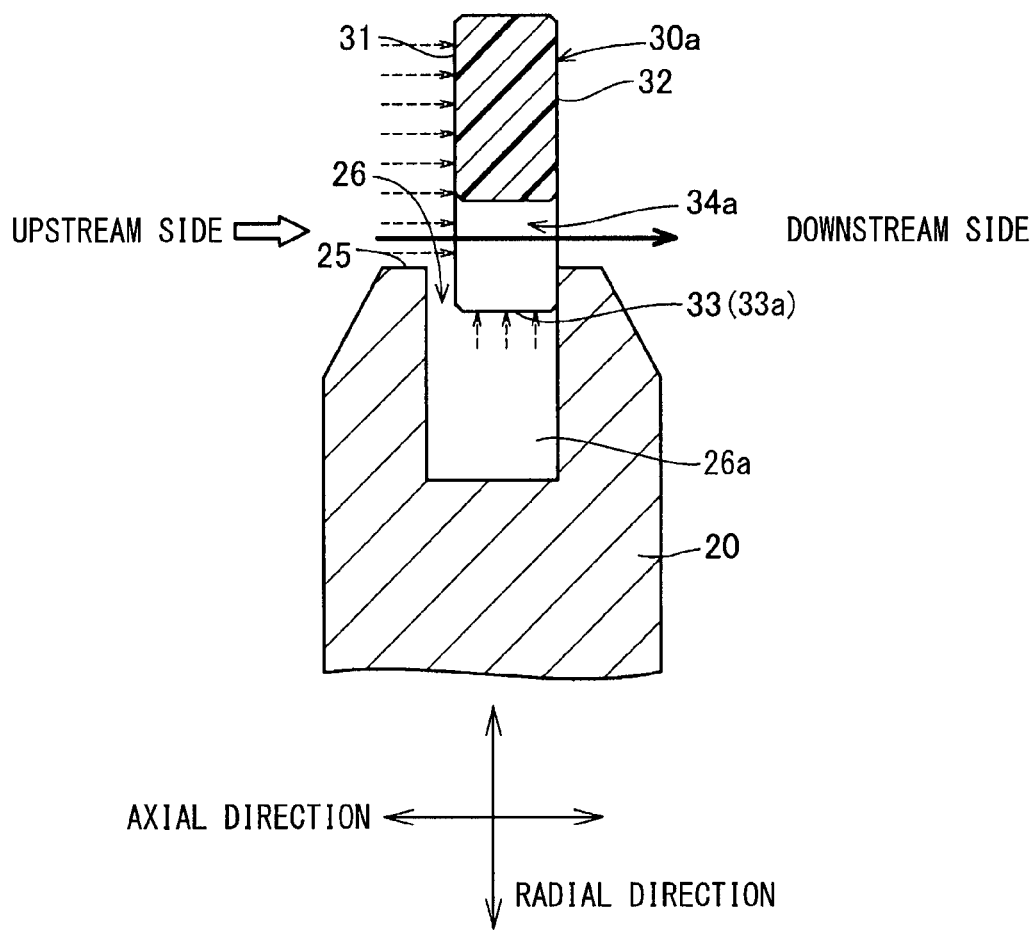
FIG. 8 is a schematic cross-sectional view taken along a line VIII-VIII in FIG. 7 for explaining an operation of the seal ring of the second embodiment, when a valve member is in its valve opened position.

As shown in FIGS. 7 and 8, the seal ring 30a of the second embodiment has multiple cut-out portions 34a at the places of the recessed portions 34 of the first embodiment. Each of the cut-out portions 34a passes through the seal ring 30a in the axial direction. The cut-out portion 34a corresponds to "the fluid escape portion". The seal ring 30a is made of the resin in the same manner to the seal ring 30 of the first embodiment.

FIG. 8 is a cross-sectional view taken along a line VIII-VIII in FIG. 7 and shows the seal ring 30a and a part of the valve member 20 including the outer peripheral portion 25 thereof.

As shown in FIG. 8, in the seal ring 30a having the cut-out portions 34a, the fluid flows through the cut-out portions 34a of the seal ring 30a from the upstream side to the downstream side when the valve member 20 is moved to the valve opened position, before the seal ring 30a is expanded in the radial-outward direction and comes out in the radial-outward direction from the valve-side annular groove 26. According to the valve device 10a of the second embodiment, it is possible to prevent the seal ring 30a from coming out from the annular groove 26, in the same manner to the valve device 10 of the first embodiment having the seal ring 30. In addition, since the cut-out portions 34a pass through the seal ring 30a in the axial direction, the fluid can more smoothly flow from the upstream side to the downstream side when compared the cut-out portions 34a with the recessed portions 34 of the first embodiment. It is therefore possible to more effectively decrease the fluid pressure in the radial-inside space 26a of the annular groove 26 at the inner peripheral portion 33 of the seal ring 30a.

The location of the cut-out portions 34a at the radial-inside position of the axial-side sealing surface portion 39 as well as the arrangement of the cut-out portions 34a at equal intervals in the circumferential direction in the valve device 10a of the second embodiment is the same to that of the recessed portions 34 in the valve device 10 of the first embodiment. Therefore, the valve device 10a can obtain the substantially same advantages to those of the valve device 10 of the first embodiment. Since the seal ring 30a is made of the resin, it is likewise possible to easily manufacture the seal ring 30a.

Third Embodiment

A valve device 10b of a third embodiment will be explained with reference to FIGS. 9 and 10. The third embodiment is different from the first embodiment in that the seal ring 30 of the first embodiment is replaced by a seal ring 30b.

Figure 9:
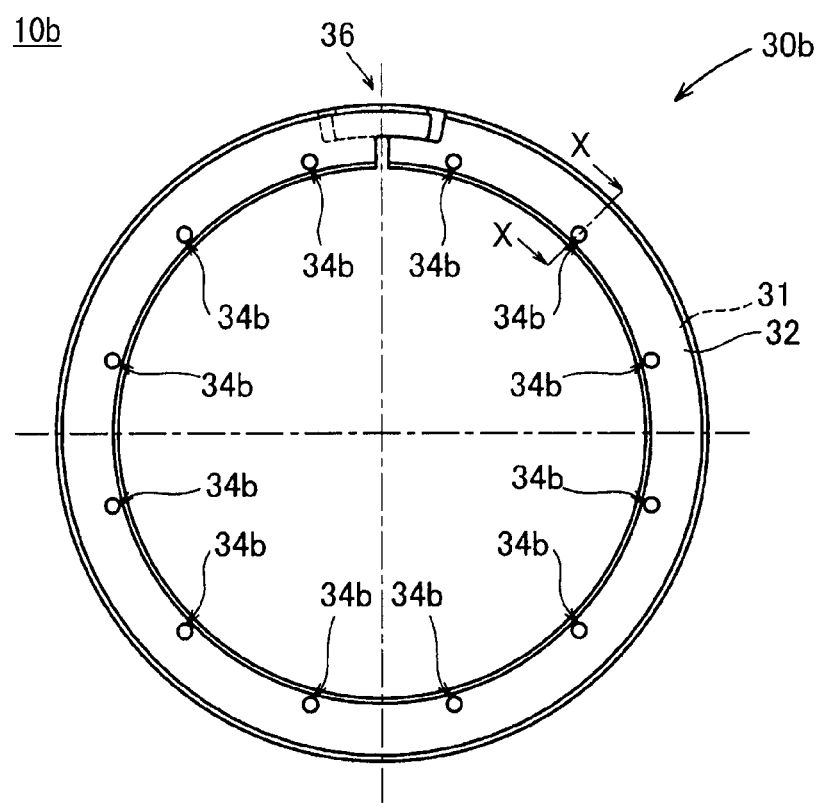
FIG. 9 is a schematic front view of a seal ring according to a third embodiment of the present disclosure.
Figure 10:
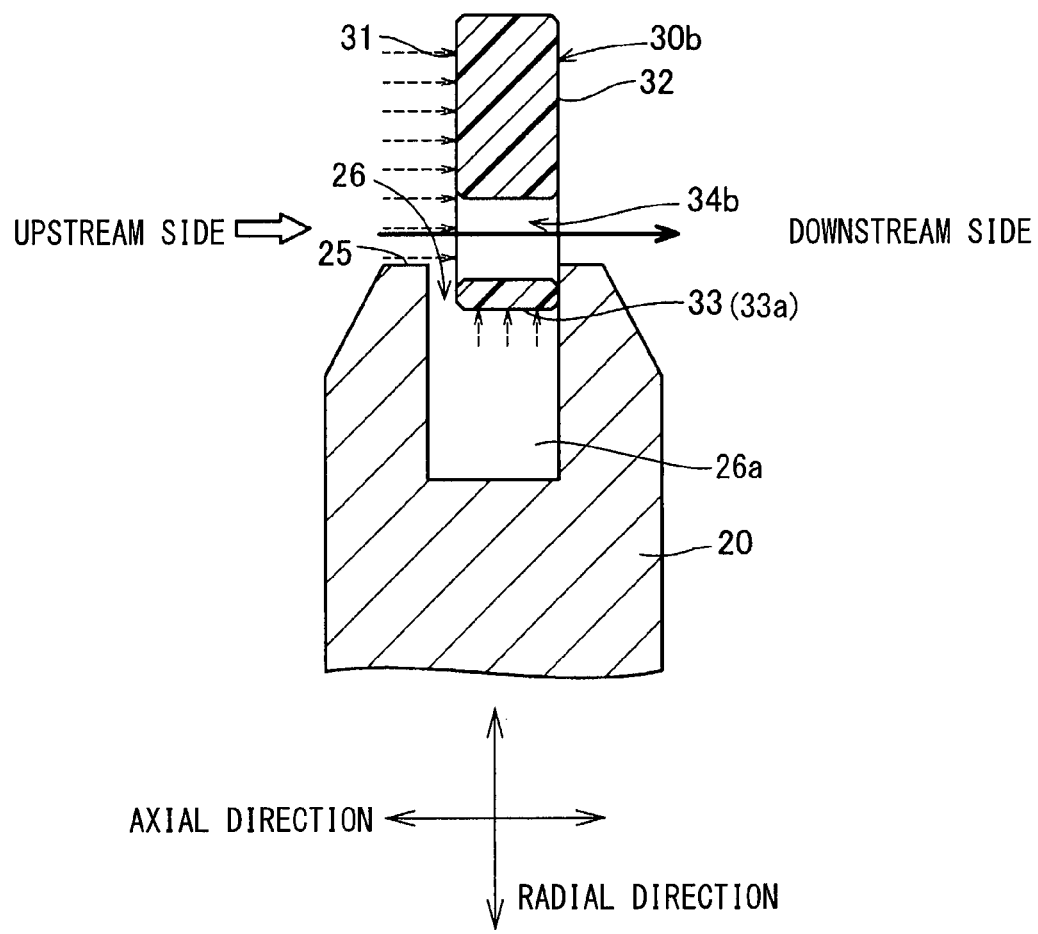
FIG. 10 is a schematic cross-sectional view taken along a line X-X in FIG. 9 for explaining an operation of the seal ring of the third embodiment, when a valve member is in its valve opened position.

As shown in FIGS. 9 and 10, the seal ring 30b of the third embodiment has multiple through-hole portions 34b at the places of the recessed portions 34 of the first embodiment. Each of the through-hole portions 34b passes through the seal ring 30b in the axial direction. The through-hole portion 34b corresponds to "the fluid escape portion". The seal ring 30b is made of the resin in the same manner to the seal ring 30 of the first embodiment.

FIG. 10 is a cross-sectional view taken along a line X-X in FIG. 9 and shows the seal ring 30b and a part of the valve member 20 including the outer peripheral portion 25 thereof.

As shown in FIG. 10, in the seal ring 30b having the through-hole portions 34b, the fluid flows through the through-hole portions 34b of the seal ring 30b from the upstream side to the downstream side when the valve member 20 is moved to the valve opened position, before the seal ring 30b is expanded in the radial-outward direction and comes out in the radial-outward direction from the valve-side annular groove 26. According to the valve device 10b of the third embodiment, it is possible to prevent the seal ring 30b from coming out from the annular groove 26, in the same manner to the valve device 10 of the first embodiment having the seal ring 30. In addition, since the through-hole portions 34b pass through the seal ring 30b in the axial direction, the fluid can more smoothly flow from the upstream side to the downstream side when compared the through-hole portions 34b with the recessed portions 34 of the first embodiment. It is therefore possible to more effectively decrease the fluid pressure in the radial-inside space 26a of the annular groove 26 at the inner peripheral portion 33 of the seal ring 30b. In addition, it is possible in the third embodiment having the through-hole portions 34b to more effectively suppress the decrease of the stiffness of the seal ring 30b, when compared the through-hole portions 34b with the recessed portions 34 of the first embodiment or the cut-out portions 34a of the second embodiment.

The location (at the radial-inside position of the axial-side sealing surface portion 39) and the arrangement (at equal intervals in the circumferential direction) of the through-hole portions 34b in the valve device 10b of the third embodiment are the same to those of the recessed portions 34 in the valve device 10 of the first embodiment. Therefore, the valve device 10b of the third embodiment can obtain the substantially same advantages to those of the valve device 10 of the first embodiment. Since the seal ring 30b is made of the resin, it is also possible to easily manufacture the seal ring 30b.

Fourth Embodiment

A valve device 10c of a fourth embodiment will be explained with reference to FIGS. 11 to 13. The fourth embodiment is different from the first embodiment in that each of the valve member 20 and the seal ring 30 of the first embodiment are replaced by a valve member 20c and a seal ring 30c.

Figure 11:
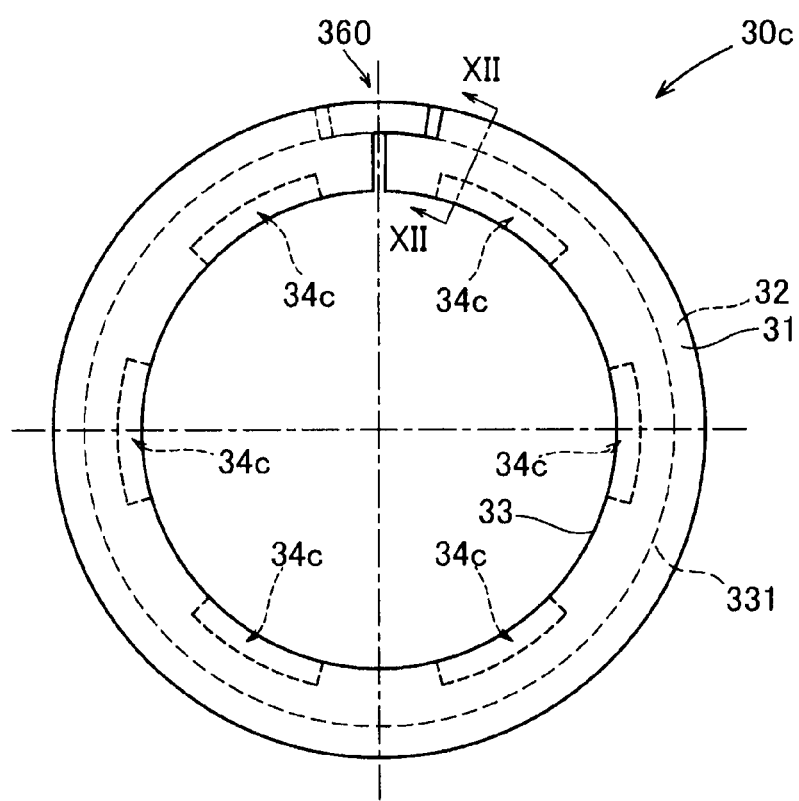
FIG. 11 is a schematic front view of a seal ring according to a fourth embodiment of the present disclosure.
Figure 12:
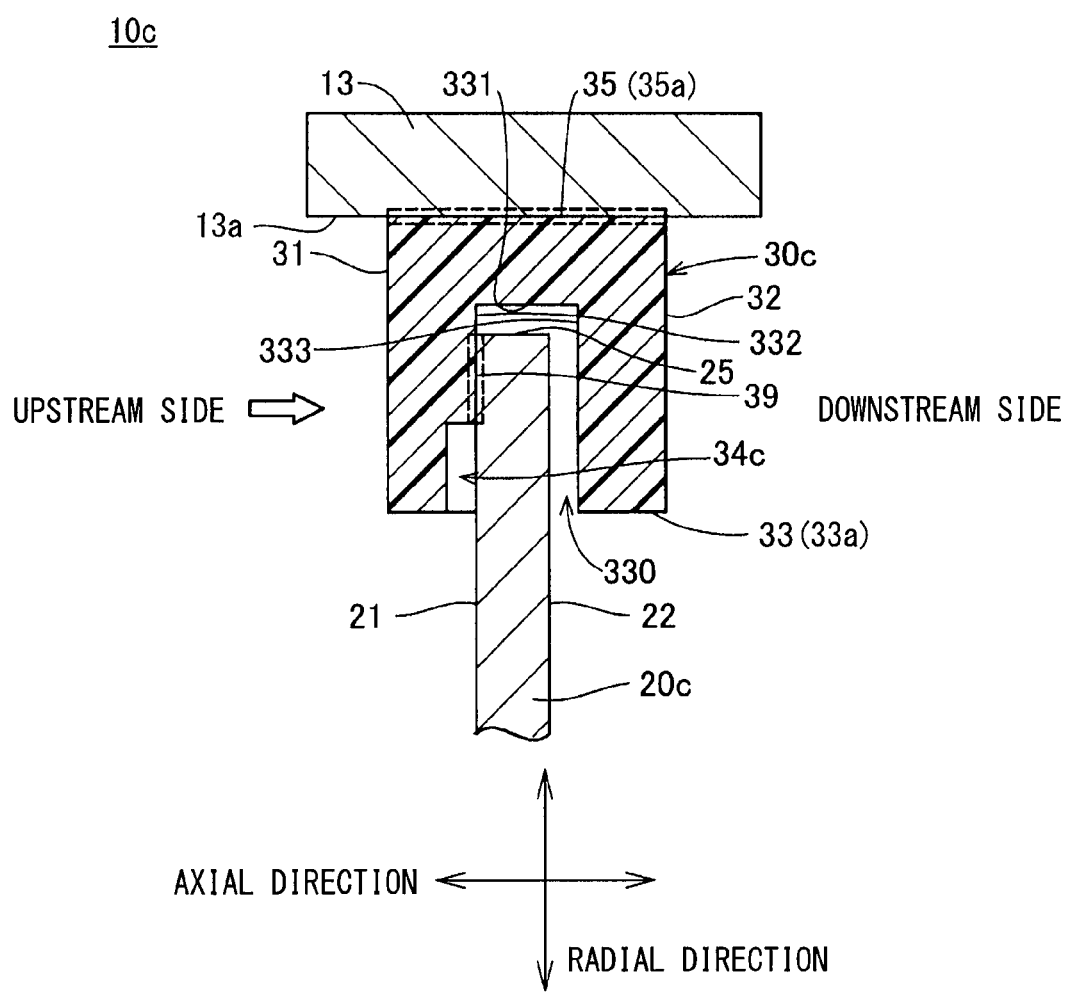
FIG. 12 is a schematic cross-sectional view taken along a line XII-XII in FIG. 11 for explaining an operation of the seal ring of the fourth embodiment, when a valve member is in its valve closed position.
Figure 13:
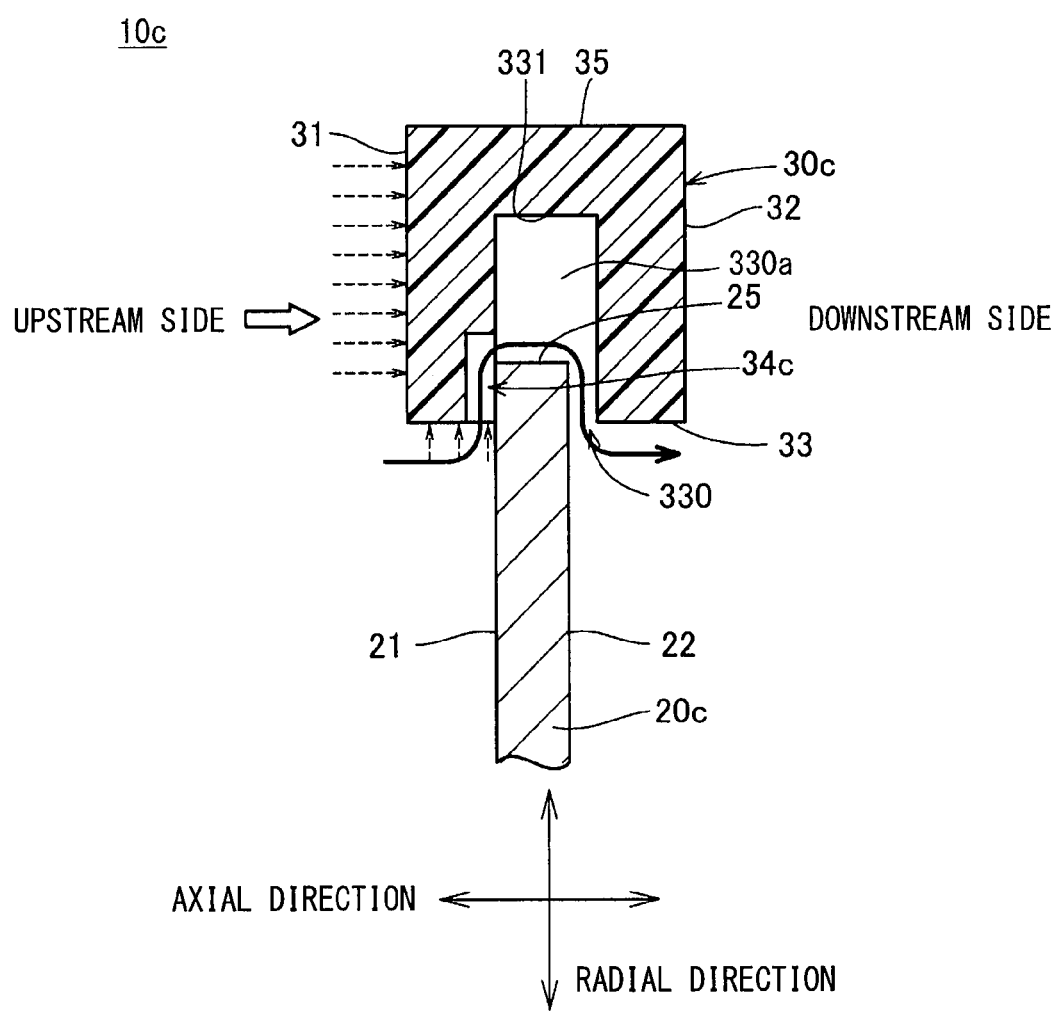
FIG. 13 is a schematic cross-sectional view for explaining the operation of the seal ring of the fourth embodiment, when the valve member is in its valve opened position.

As shown in FIGS. 11 to 13, the valve member 20c is formed in a disc shape and the seal ring 30c is formed in a ring shape. As shown in FIG. 12, a ring-side annular groove 330 is formed at the inner peripheral portion 33 of the seal ring 30c. The ring-side annular groove 330 has a cross section of a rectangular shape, which is recessed in the radial-outward direction from the inner peripheral surface 33a. FIG. 12 is a cross-sectional view taken along a line XII-XII in FIG. 11 and shows the seal ring 30c and a part of the valve member 20c including the outer peripheral portion 25 thereof.

The valve member 20c is made of the metal in the same manner to the valve member 20 of the first embodiment. The seal ring 30c is made of the resin in the same manner to the seal ring 30 of the first embodiment.

As shown in FIG. 12, the outer peripheral portion 25 of the valve member 20c is inserted into the ring-side annular groove 330. As shown in FIG. 11, a fitting portion 360 which is similar to the fitting portion 36 of the first embodiment is provided in the seal ring 30c. When assembling the seal ring 30c to the valve member 20c, the seal ring 30c is expanded in the radial-outward direction in such a way that both circumferential ends of the seal ring 30c at the fitting portion 360 are separated from each other in the circumferential direction. The diameter of the seal ring 30c is reduced after the outer peripheral portion 25 of the valve member 20c is inserted into the ring-side annular groove 330.

As shown in FIG. 12, the seal ring 30c is pushed by the fluid pressure in the axial direction to the downstream side when the valve member 20c is in the valve closed position. A part of an upstream-side groove surface 332 of the ring-side annular groove 330 (hereinafter, also referred to as the axial-side sealing surface portion 39) is tightly in contact with an upstream-side valve surface 21 of the valve member 20c at the outer peripheral portion 25. In addition, the seal ring 30c is expanded in the radial-outward direction by the pressure difference between the fluid pressure at the inner peripheral portion 33 and the fluid pressure at the outer peripheral portion 35 of the seal ring 30c. Therefore, the outer peripheral surface 35a (working as the radial-side sealing surface portion) of the outer peripheral portion 35 of the seal ring 30c is tightly in contact with the inner peripheral surface 13a of the nozzle member 13.

According to the above structure, not only the axial-side sealing surface portion 39 of the upstream-side groove surface 332 of the ring-side annular groove 330 is tightly in contact with the upstream-side valve surface 21 of the valve member 20c in the axial direction but also the radial-side sealing surface portion 35a at the outer peripheral portion 35 of the seal ring 30c is tightly in contact with the inner peripheral surface 13a of the nozzle member 13 in the radial direction, when the valve member 20c is in the valve closed position. The function of the fitting portion 360 of the present embodiment is the same to that of the fitting portion 36 of the first embodiment.

As shown in FIGS. 11 and 12, multiple recessed portions 34c are formed on the upstream-side groove surface 332 of the ring-side annular groove 330 at radial-inside positions of the axial-side sealing surface portion 39 of the seal ring 30c, in a similar manner to the recessed portions 34 of the first embodiment. The radial-inside position is a position closer to the inner peripheral portion 33 than the axial-side sealing surface portion 39 in the radial direction. As shown in FIG. 12, the axial-side sealing surface portion 39 is in contact with the upstream-side valve surface 21 and thereby the recessed portions 34c are closed. The fluid is not allowed to flow from the upstream side to the downstream side through the recessed portions 34c, when the valve member 20c is moved to the valve closed position.

As shown in FIG. 13, when the valve member 20c is moved to the valve opened position, the fluid can flow in the axial direction from the upstream side to the downstream side through a radial-inside space 330a formed in the ring-side annular groove 330 and through the recessed portions 34c, before the seal ring 30c is expanded in the radial-outward direction and thereby the seal ring 30c comes out from the valve member 20c. Accordingly, it is possible to decrease the fluid pressure in the radial-inside space 330a, which is formed in the ring-side annular groove 330 between a groove bottom portion 331 of the seal ring 30c and the outer peripheral portion 25 of the valve member 20c. It is therefore possible to make smaller the pressure difference between the fluid pressure at the inner peripheral portion 33 and the groove bottom portion 331 and the fluid pressure at the outer peripheral portion 35 of the seal ring 30c. As a result, it is possible to prevent the seal ring 30c from coming out from the valve member 20c. The recessed portion 34c corresponds to the fluid escape portion.

In the valve device 10c of the fourth embodiment, the location of the recessed portions 34c at the radial-inside position of the axial-side sealing surface portion 39 and the arrangement of the recessed portions 34c at the equal intervals in the circumferential direction are the same to those of the recessed portions 34 in the valve device 10 of the first embodiment. Therefore, the valve device 10c of the fourth embodiment can obtain the substantially same advantages to those of the valve device 10 of the first embodiment. Since the seal ring 30c is made of the resin, it is likewise possible to easily manufacture the seal ring 30c.

Fifth Embodiment

A valve device 10d of a fifth embodiment will be explained with reference to FIGS. 14 and 15. The fifth embodiment is different from the fourth embodiment in that the seal ring 30c of the fourth embodiment is replaced by a seal ring 30d.

Figure 14:
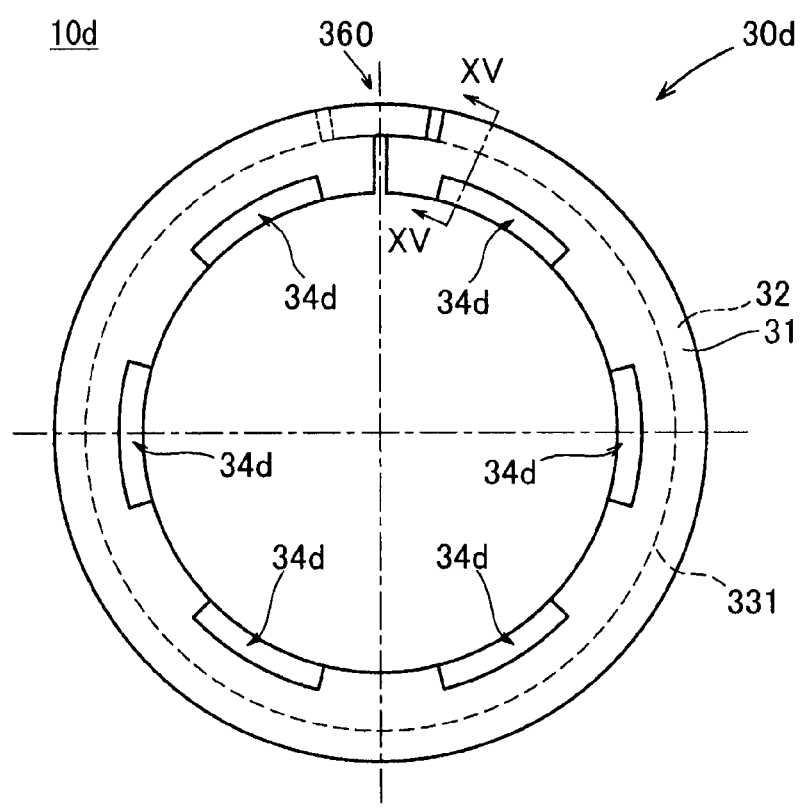
FIG. 14 is a schematic front view of a seal ring according to a fifth embodiment of the present disclosure.
Figure 15:
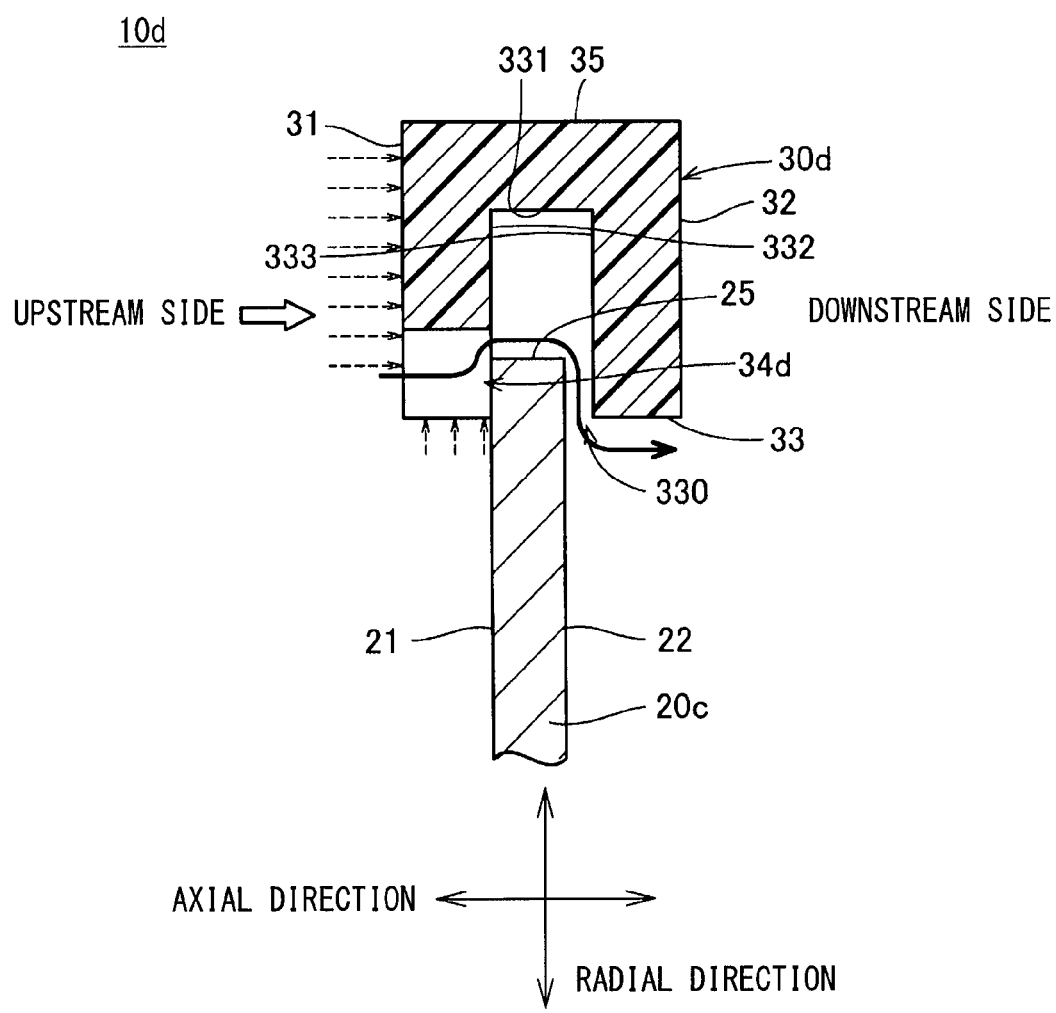
FIG. 15 is a schematic cross-sectional view taken along a line XV-XV in FIG. 14 for explaining an operation of the seal ring of the fifth embodiment, when a valve member is in its valve opened position.

As shown in FIGS. 14 and 15, multiple cut-out portions 34d are formed in the seal ring 30d instead of and at places of the recessed portions 34c of the fourth embodiment. Each of the cut-out portions 34d passes through an upstream-side wall portion of the seal ring 30d, like the cut-out portion 34a of the seal ring 30a of the second embodiment (FIG. 8). The cut-out portion 34d corresponds to the fluid escape portion. The seal ring 30d is made of the resin in the same manner to the seal ring 30c of the fourth embodiment (FIGS. 11 to 13).

FIG. 15 is a cross-sectional view taken along a line XV-XV in FIG. 14 and shows the seal ring 30d and a part of the valve member 20c including the outer peripheral portion 25 thereof.

As shown in FIG. 15, it is possible to prevent the seal ring 30d from coming out from the valve member 20c when the valve member 20c is moved to the valve opened position, in the same manner to the seal ring 30c of the fourth embodiment (FIG. 13). In the seal ring 30d having the cut-out portions 34d, it is possible to decrease the fluid pressure applied to the inner peripheral portion 33 and the groove bottom portion 331, in a similar manner to the cut-out portions 34a of the second embodiment (FIG. 8) or to the recessed portions 34c of the fourth embodiment (FIG. 13). In addition, the fluid pressure can be more effectively decreased by the cut-out portions 34d than the case of the recessed portions 34c of the fourth embodiment (FIG. 13).

In the valve device 10d of the fifth embodiment, the location of the cut-out portions 34d (at the radial-inside position of the axial-side sealing surface portion 39) and the arrangement of the cut-out portions 34d (at the equal intervals in the circumferential direction) are the same to those of the recessed portions 34c in the valve device 10c of the fourth embodiment. Therefore, the valve device 10d of the fifth embodiment can obtain the substantially same advantages to those of the valve device 10c of the fourth embodiment. Since the seal ring 30d is made of the resin, it is likewise possible to easily manufacture the seal ring 30d.

Sixth Embodiment

A valve device 10e of a sixth embodiment will be explained with reference to FIGS. 16 and 17. The sixth embodiment is different from the fourth embodiment in that the seal ring 30c of the fourth embodiment is replaced by a seal ring 30e.

Figure 16:
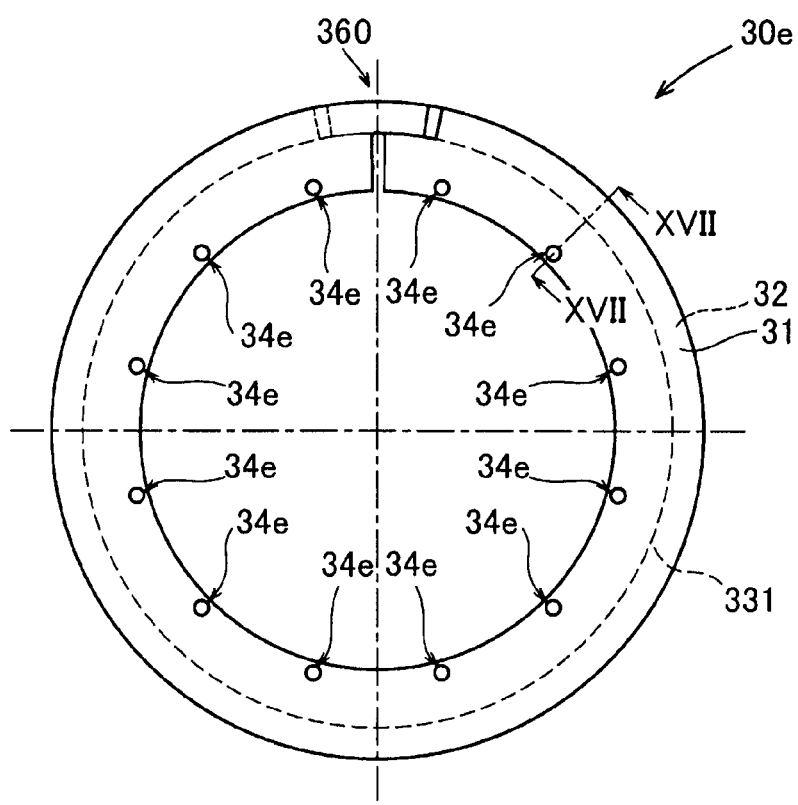
FIG. 16 is a schematic front view of a seal ring according to a sixth embodiment of the present disclosure.
Figure 17:
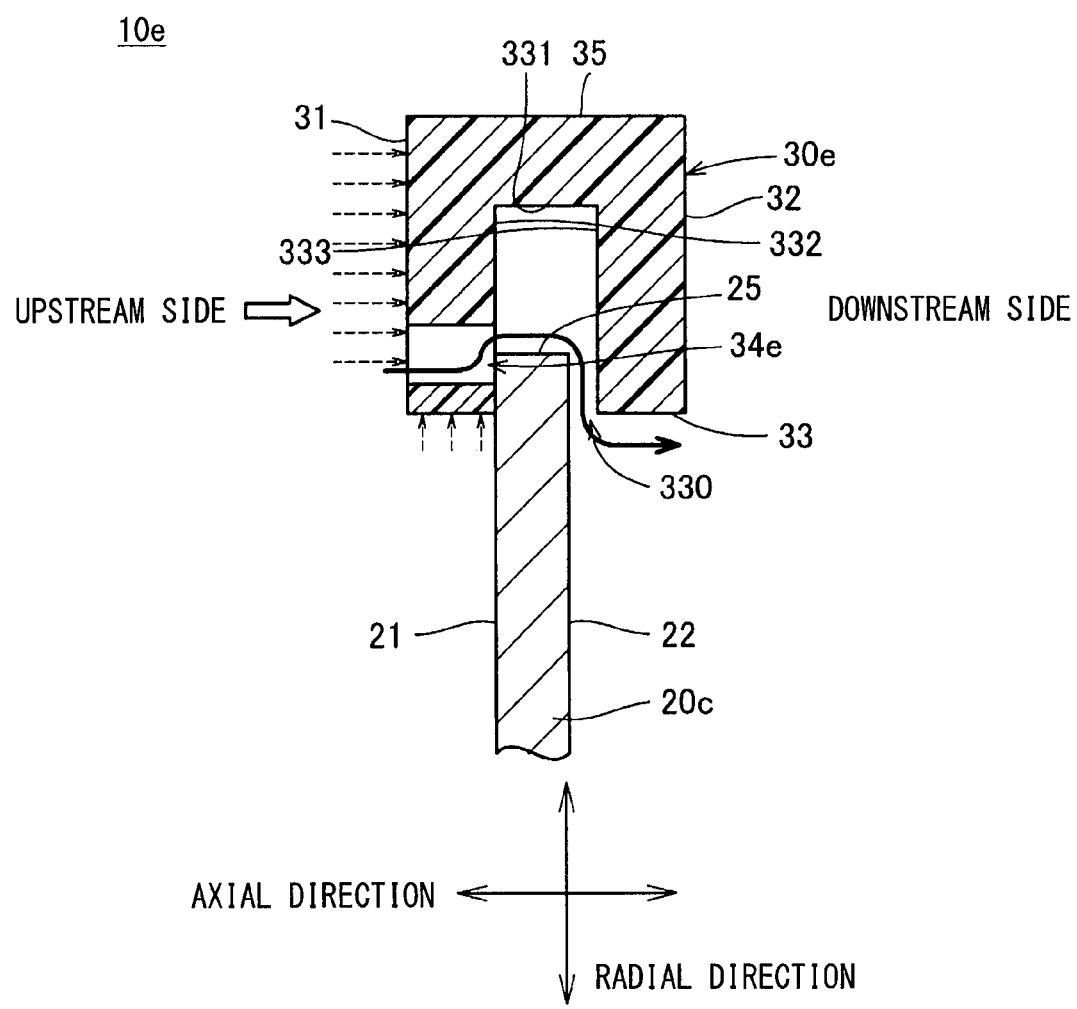
FIG. 17 is a schematic cross-sectional view taken along a line XVII-XVII in FIG. 16 for explaining an operation of the seal ring of the sixth embodiment, when a valve member is in its valve opened position.

As shown in FIGS. 16 and 17, multiple through-hole portions 34e are formed in the seal ring 30e instead of and at places of the recessed portions 34c of the fourth embodiment (FIGS. 11-13). Each of the through-hole portions 34e passes through the upstream-side wall portion of the seal ring 30e, like the through-hole portion 34b of the seal ring 30*b* of the third embodiment (FIG. 10). The through-hole portion 34*e* corresponds to the fluid escape portion. The seal ring 30*e* is made of the resin in the same manner to the seal ring 30*c* of the fourth embodiment.

FIG. 17 is a cross-sectional view taken along a line XVII-XVII in FIG. 16 and shows the seal ring 30*e* and a part of the valve member 20*c* including the outer peripheral portion 25 thereof.

As shown in FIG. 17, it is possible to prevent the seal ring 30*e* from coming out from the valve member 20*c* when the valve member 20*c* is moved to the valve opened position. In the seal ring 30*e* having the through-hole portions 34*e*, it is possible to decrease the fluid pressure applied to the inner peripheral portion 33 and the groove bottom portion 331, in a similar manner to the through-hole portions 34*b* of the third embodiment (FIG. 10) or to the recessed portions 34*c* of the fourth embodiment (FIG. 13). In addition, the fluid pressure can be more effectively decreased by the through-hole portions 34*e* than the case of the recessed portions 34*c* of the fourth embodiment (FIG. 13). Furthermore, it is possible in the sixth embodiment having the through-hole portions 34*e* to suppress decrease of the stiffness of the seal ring 30*e*, when compared the through-hole portions 34*e* with the recessed portions 34*c* of the fourth embodiment (FIG. 13) or the cut-out portions 34*d* of the fifth embodiment (FIG. 15).

In the valve device 10*e* of the sixth embodiment, the location of the through-hole portions 34*e* (at the radial-inside position of the axial-side sealing surface portion 39) and the arrangement of the through-hole portions 34*e* (at the equal intervals in the circumferential direction) are the same to those of the recessed portions 34*c* in the valve device 10*c* of the fourth embodiment. Therefore, the valve device 10*e* of the sixth embodiment can obtain the substantially same advantages to those of the valve device 10*c* of the fourth embodiment. Since the seal ring 30*e* is made of the resin, it is likewise possible to easily manufacture the seal ring 30*e*.

Seventh Embodiment

A valve device 10*f* of a seventh embodiment will be explained with reference to FIGS. 18 and 19. The seventh embodiment is different from the first embodiment in that the seal ring 30 and the valve member 20 of the first embodiment are respectively replaced by a seal ring 30*f* and a valve member 20*f*.

Figure 18:
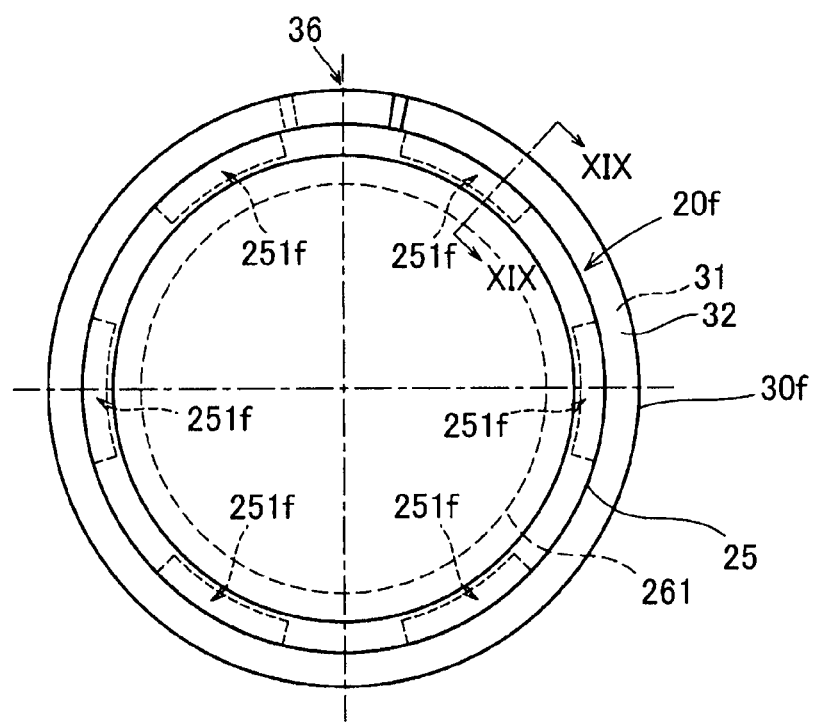
FIG. 18 is a schematic front view of a seal ring and a valve member according to a seventh embodiment of the present disclosure.
Figure 19:
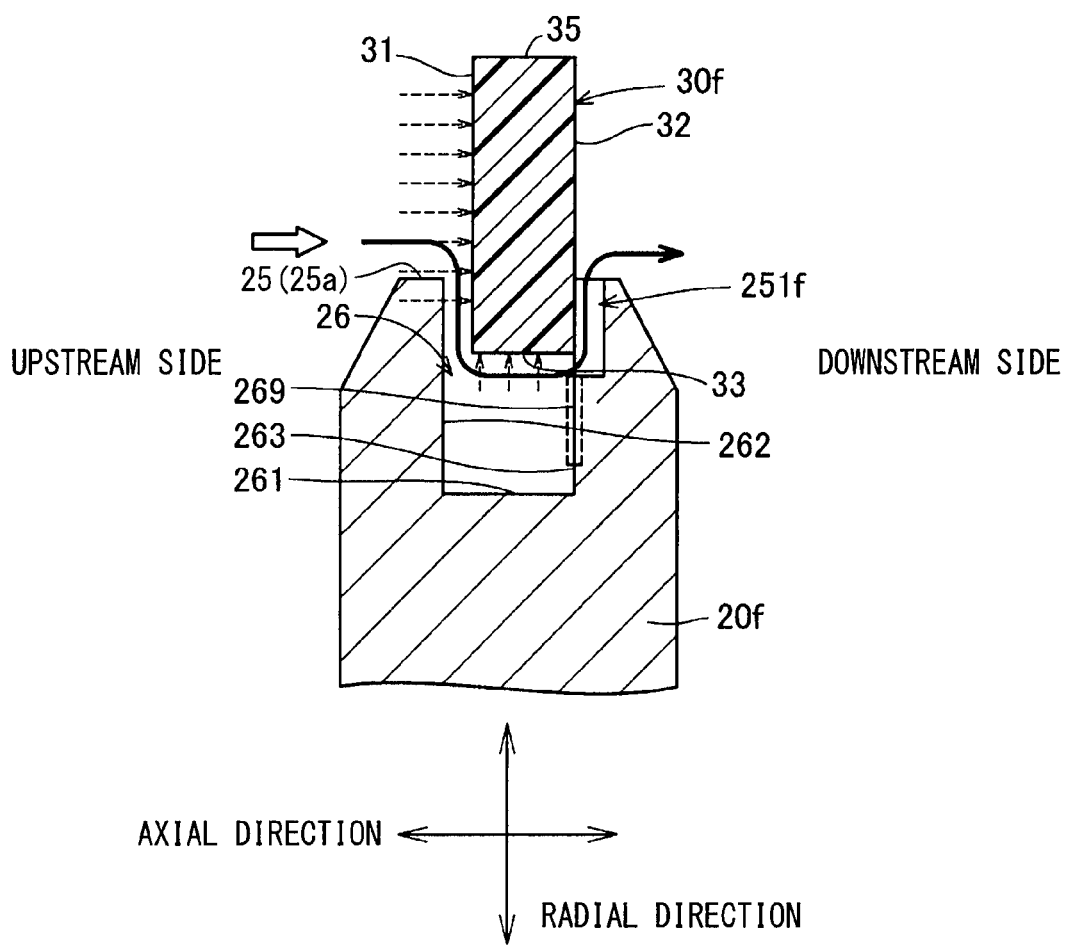
FIG. 19 is a schematic cross-sectional view taken along a line XIX-XIX in FIG. 18 for explaining an operation of the seal ring and the valve member of the seventh embodiment, when the valve member is in its valve opened position.

As shown in FIGS. 18 and 19, each structure of the seal ring 30*f* and the valve member 20*f* is basically the same to that of the seal ring 30 and the valve member 20 of the first embodiment. In the seventh embodiment, multiple recessed portions 251*f* are formed as the fluid escape portions in the downstream-side groove surface 263 of the valve-side annular groove 26, instead of the recessed portions 34 formed in the seal ring 30 of the first embodiment. More exactly, each of the recessed portions 251*f* is formed in a downstream-side wall portion, namely, in the downstream-side groove surface 263 of the outer peripheral portion 25 of the valve member 20*f*. Furthermore, the recessed portion 251*f* is formed at a radial-outside position of an axial-side sealing surface portion 269 on the downstream-side groove surface 263. The seal ring 30*f* is pushed by the fluid pressure in the axial direction to the downstream-side groove surface 263 when the valve member 20*f* is moved to the valve closed position and the downstream-side ring surface 32 of the sealing ring 30*f* is tightly in contact with the axial-side sealing surface portion 269 of the valve member 20*f*. The multiple recessed portions 251*f* are arranged at equal intervals in the circumferential direction of the valve member 20*f*. Each of the recessed portions 251*f* is recessed in the axial-downward direction from the downstream-side groove surface 263 and in the radial-inside direction from the outer peripheral surface 25*a* of the outer peripheral portion 25. Each of the multiple recessed portions 251*f* is located at a circumferential-outside position of a groove portion corresponding to the fitting portion 36 of the seal ring 30*f*.

FIG. 19 is a cross-sectional view taken along a line XIX-XIX in FIG. 18 and shows the seal ring 30*f* and a part of the valve member 20*f* including the outer peripheral portion 25 thereof.

As shown in FIG. 19, in the structure of the valve member 20*f* having the recessed portions 251*f*, the fluid can flow from the upstream side to the downstream side through the recessed portions 251*f* formed in the valve-side annular groove 26 before the seal ring 30*f* comes out from the valve-side annular groove 26, when the valve member 20*f* is moved to the valve opened position. As a result, it is possible to prevent the seal ring 30*f* from coming out from the valve-side annular groove 26 of the valve member 20*f*, in the same manner to the valve device 10 of the first embodiment having the seal ring 30.

In the valve device 10*f* of the seventh embodiment, the location of the recessed portions 251*f* (at the radial-outside position of the axial-side sealing surface portion 269) and the arrangement of the recessed portions 251*f* (at the equal intervals in the circumferential direction) are similar to those of the recessed portions 34 in the valve device 10 of the first embodiment. Therefore, the valve device 10*f* of the seventh embodiment can obtain the substantially same advantages to those of the valve device 10 of the first embodiment.

Eighth Embodiment

A valve device 10*g* of an eighth embodiment will be explained with reference to FIGS. 20 and 21. The eighth embodiment is different from the seventh embodiment in that the valve member 20*f* of the seventh embodiment is replaced by a valve member 20*g*.

Figure 20:
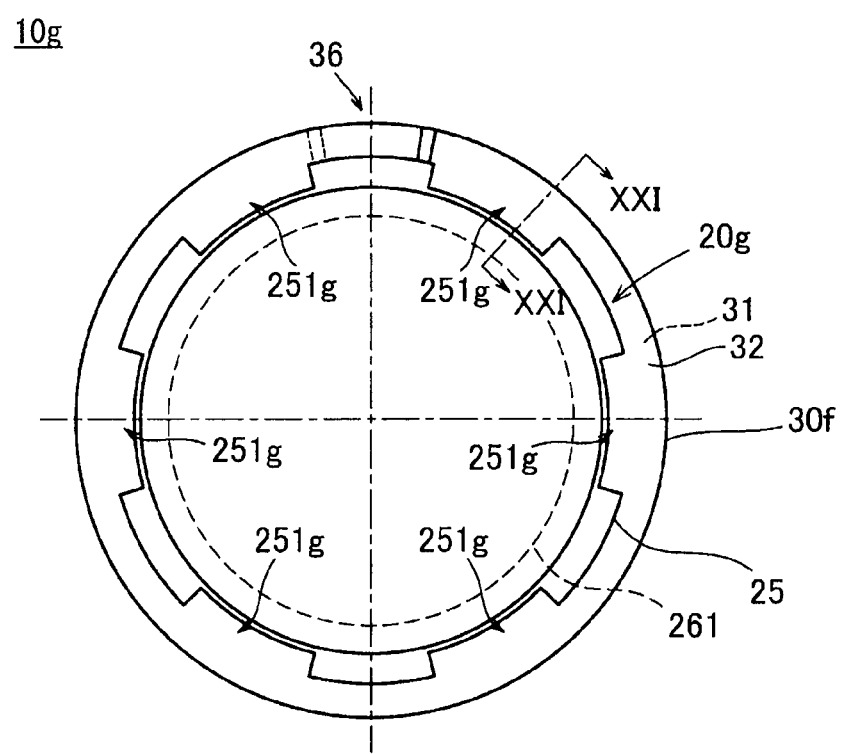
FIG. 20 is a schematic front view of a seal ring and a valve member according to an eighth embodiment of the present disclosure.
Figure 21:
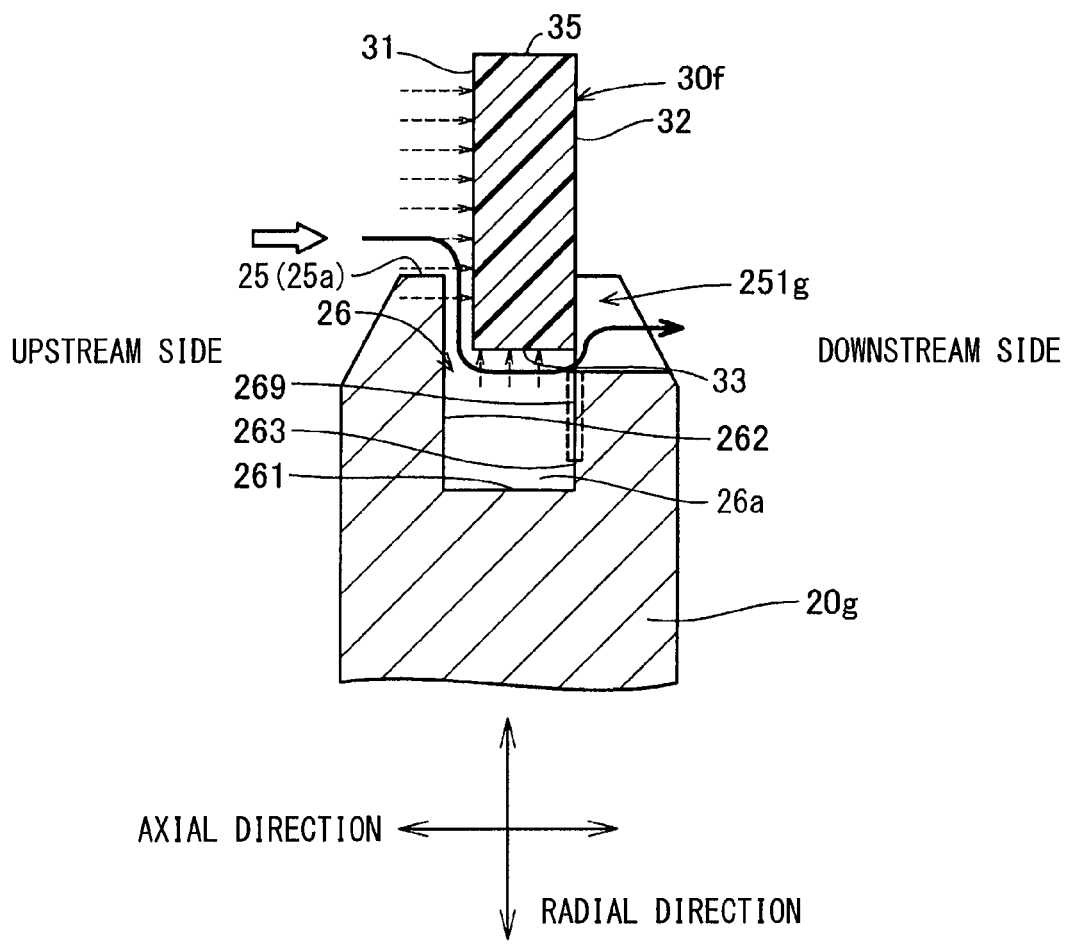
FIG. 21 is a schematic cross-sectional view taken along a line XXI-XXI in FIG. 20 for explaining an operation of the seal ring and the valve member of the eighth embodiment, when the valve member is in its valve opened position.

As shown in FIGS. 20 and 21, multiple cut-out portions 251*g* are formed at the downstream-side wall portion of the outer peripheral portion 25 of the valve member 20*g*, instead of the recessed portions 251*f* of the seventh embodiment. Each of the cut-out portions 251*g* penetrates the downstream-side wall portion of the valve-side annular groove 26 in the axial direction. In addition, each of the cut-out portions 251*g* is recessed in the radial-inside direction from the outer peripheral surface 25*a* of the outer peripheral portion 25. The cut-out portion 251*g* corresponds to the fluid escape portion.

FIG. 21 is a cross-sectional view taken along a line XXI-XXI in FIG. 20 and shows the seal ring 30*f* and a part of the valve member 20*g* including the outer peripheral portion 25 thereof.

As shown in FIG. 21, in the valve member 20*g* having the cut-out portions 251*g*, the fluid can flow from the upstream side to the downstream side through the cut-out portions 251*g* formed in the downstream-side wall portion of the valve member 20*g* before the seal ring 30*f* comes out from the valve-side annular groove 26, when the valve member 20*g* is moved to the valve opened position. As a result, it is possible to prevent the seal ring 30*f* from coming out from the valve-side annular groove 26 of the valve member 20*g*, in the same manner to the valve device 10 of the first embodiment having the seal ring 30. Since the cut-out portion 251*g* has a structure, in which the fluid can more easily flow from the upstream side to the downstream side than the recessed portion 251f, it is possible to more effectively decrease the fluid pressure in the radial-inside space 26a of the valve-side annular groove 26, which is applied to the inner peripheral portion 33 of the seal ring 30f.

In the valve device 10g of the eighth embodiment, the location of the cut-out portions 251g (at the radial-outside position of the axial-side sealing surface portion 269) and the arrangement of the cut-out portions 251g (at the equal intervals in the circumferential direction) are the same to those of the recessed portions 251f in the valve device 10f of the seventh embodiment. Therefore, the valve device 10g of the eighth embodiment can obtain the substantially same advantages to those of the valve device 10f of the seventh embodiment.

Ninth Embodiment

A valve device 10h of a ninth embodiment will be explained with reference to FIGS. 22 and 23. The ninth embodiment is different from the seventh embodiment in that the valve member 20f of the seventh embodiment is replaced by a valve member 20h.

Figure 22:
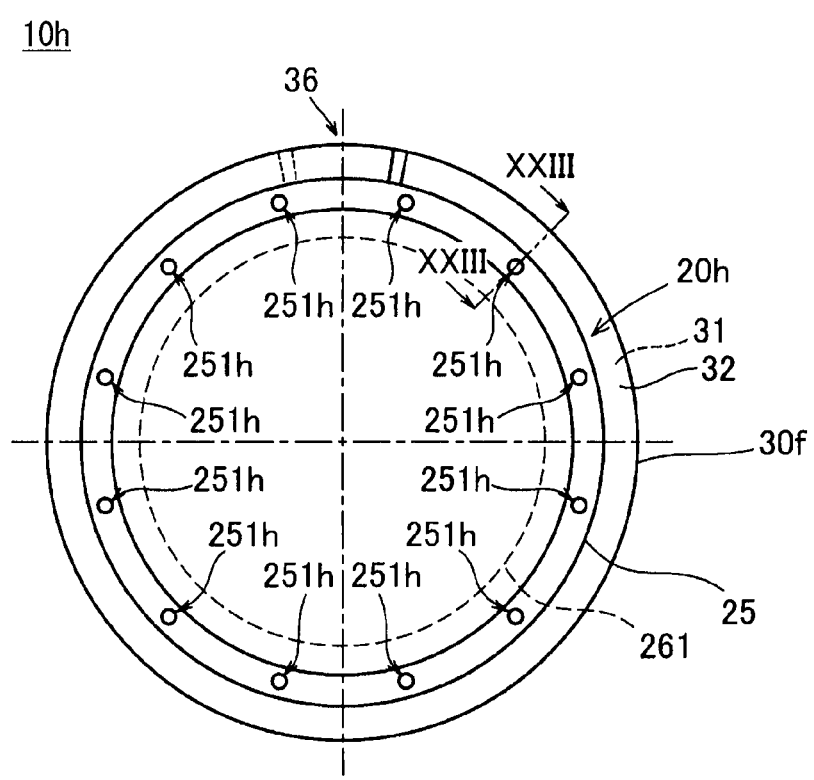
FIG. 22 is a schematic front view of a seal ring and a valve member according to a ninth embodiment of the present disclosure.
Figure 23:
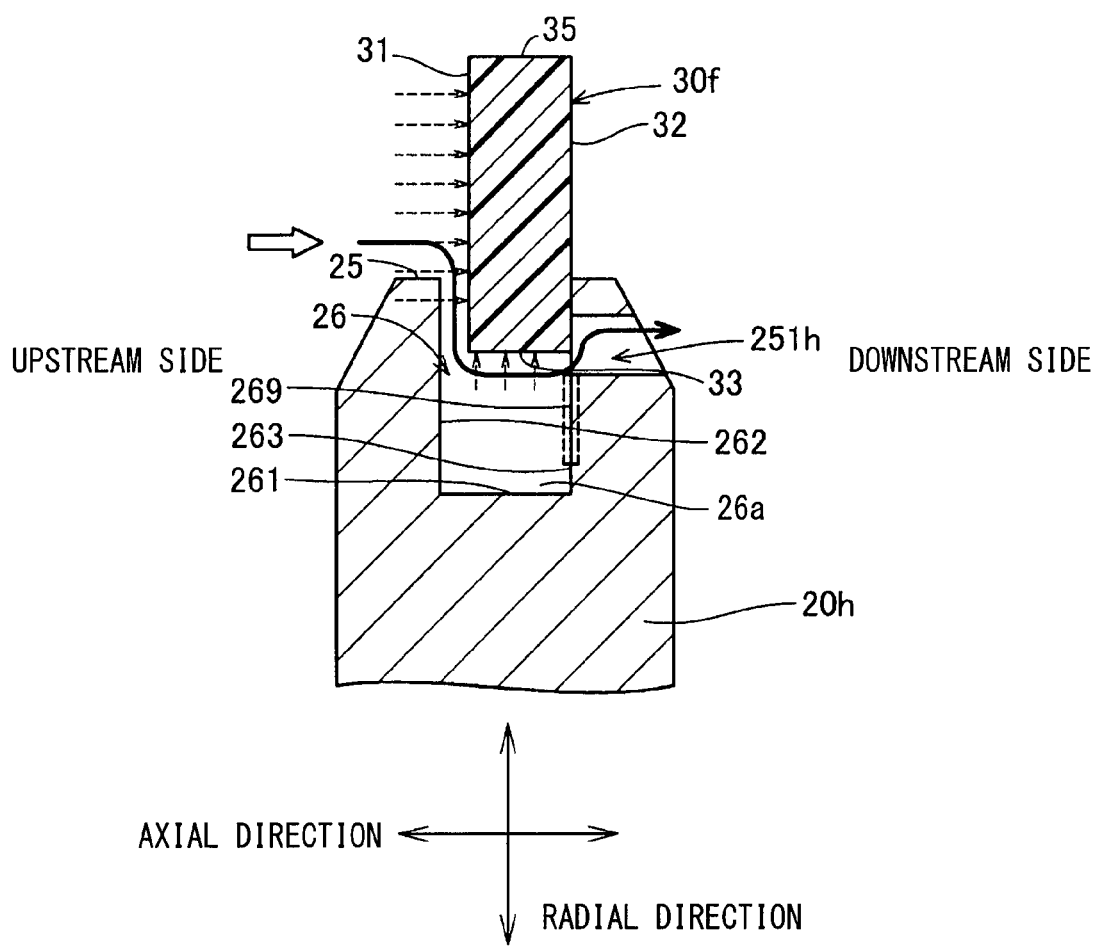
FIG. 23 is a schematic cross-sectional view taken along a line XXIII-XXIII in FIG. 22 for explaining an operation of the seal ring and the valve member of the ninth embodiment, when the valve member is in its valve opened position.

As shown in FIGS. 22 and 23, multiple through-hole portions 251h are formed in the downstream-side wall portion of the outer peripheral portion 25 of the valve member 20h, instead of the recessed portions 251f of the seventh embodiment. Each of the through-hole portions 251h passes through the downstream-side wall portion of the valve-side annular groove 26 in the axial direction. The through-hole portion 251h corresponds to the fluid escape portion.

FIG. 23 is a cross-sectional view taken along a line XXIII-XXIII in FIG. 22 and shows the seal ring 30f and a part of the valve member 20h including the outer peripheral portion 25 thereof.

As shown in FIG. 23, in the structure of the valve member 20h having the through-hole portions 251h, the fluid can flow from the upstream side to the downstream side through the through-hole portions 251h formed in the downstream-side wall portion of the valve-side annular groove 26 before the seal ring 30f comes out from the valve-side annular groove 26, when the valve member 20h is moved to the valve opened position. As a result, it is possible to decrease the pressure difference between the fluid pressure at the inner peripheral portion 33 and the fluid pressure at the outer peripheral portion 35 of the seal ring 30f, in the same manner to the valve device 10 of the first embodiment having the seal ring 30. It is thereby possible to prevent the seal ring 30f from coming out from the valve-side annular groove 26 of the valve member 20h. Since the through-hole portion 251h has a structure, in which the fluid can more smoothly flow from the upstream side to the downstream side than the recessed portion 251f of the seventh embodiment, it is possible to more effectively decrease the fluid pressure in the radial-inside space 26a of the valve-side annular groove 26, which is applied to the inner peripheral portion 33 of the seal ring 30f.

In the valve device 10h of the ninth embodiment, the location of the through-hole portions 251h (at the radial-outside position of the axial-side sealing surface portion 269) and the arrangement of the through-hole portions 251h (at the equal intervals in the circumferential direction) are the same to those of the recessed portions 251f in the valve device 10f of the seventh embodiment. Therefore, the valve device 10h of the ninth embodiment can obtain the substantially same advantages to those of the valve device 10f of the seventh embodiment.

Tenth Embodiment

A valve device 10i of a tenth embodiment will be explained with reference to FIGS. 24 and 25. The tenth embodiment is different from the fourth embodiment (FIGS. 11 and 12) in that the seal ring 30c and the valve member 20c of the fourth embodiment are respectively replaced by a seal ring 30i and a valve member 20i.

Figure 24:
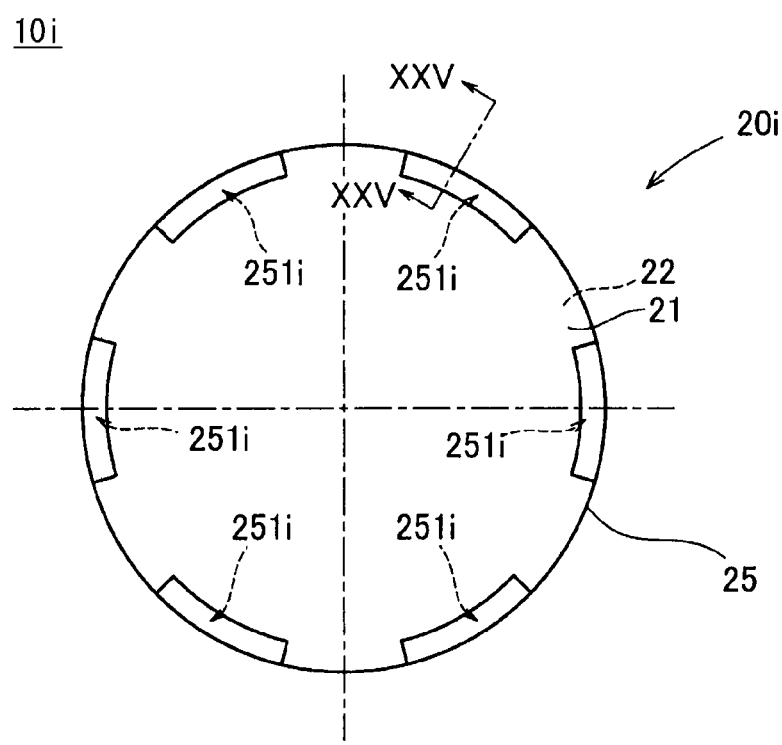
FIG. 24 is a schematic front view of a valve member according to a tenth embodiment of the present disclosure.
Figure 25:
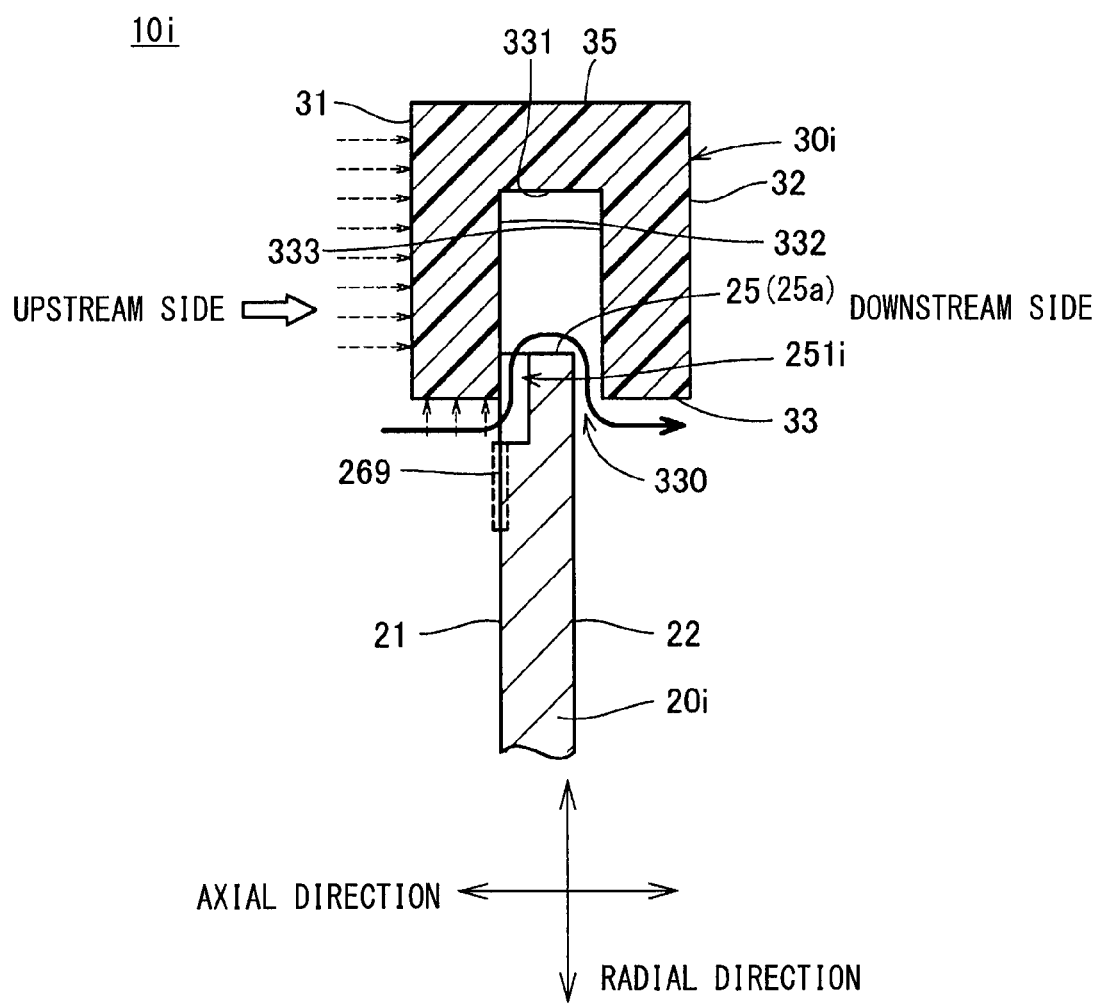
FIG. 25 is a schematic cross-sectional view taken along a line XXV-XXV in FIG. 24 for explaining an operation of the seal ring and the valve member of the tenth embodiment, when the valve member is in its valve opened position.

As shown in FIGS. 24 and 25, each structure of the seal ring 30i and the valve member 20i is basically the same to that of the seal ring 30c and the valve member 20c of the fourth embodiment. In the present embodiment, multiple recessed portions 251i are formed as the fluid escape portions in the upstream-side valve surface 21 of the valve member 20i, instead of the recessed portions 34c formed in the seal ring 30c of the fourth embodiment.

More exactly, each of the recessed portions 251i is formed in the upstream-side valve surface 21 at the outer peripheral portion 25 of the valve member 20i. Namely, the recessed portion 251i is formed at a radial-outside position of the axial-side sealing surface portion 269 on the upstream-side valve surface 21. The seal ring 30i is pushed by the fluid pressure in the axial direction to the upstream-side valve surface 21 when the valve member 20i is moved to the valve closed position and the upstream-side groove surface 332 of the seal ring 30i is tightly in contact with the axial-side sealing surface portion 269 of the valve member 20i. The multiple recessed portions 251i are arranged at equal intervals in the circumferential direction of the valve member 20i. Each of the recessed portions 251i is recessed in the axial-downward direction from the upstream-side valve surface 21 and in the radial-inside direction from the outer peripheral surface 25a of the outer peripheral portion 25. The multiple recessed portions 251i are located at the circumferential-outside position of a valve portion corresponding to the fitting portion 360 (not shown in FIGS. 24 and 25) of the seal ring 30i, in a similar manner to the multiple recessed portions 251f of the valve member 20f in the seventh embodiment.

FIG. 25 is a cross-sectional view taken along a line XXV-XXV in FIG. 24 and shows the seal ring 30i and a part of the valve member 20i including the outer peripheral portion 25 thereof.

As shown in FIG. 25, in the structure of the valve member 20i having the recessed portions 251i, the fluid can flow from the upstream side to the downstream side through the recessed portions 251i formed in the upstream-side valve surface 21 of the valve member 20i before the seal ring 30i comes out from the valve member 20i, when the valve member 20i is moved to the valve opened position. Therefore, in the valve device 10i of the tenth embodiment, it is possible to prevent the seal ring 30i from coming out from the valve member 20i, in the same manner to the valve device 10c of the fourth embodiment.

In the valve device 10i of the tenth embodiment, the location of the recessed portions 251i (at the radial-outside position of the axial-side sealing surface portion 269) and the arrangement of the recessed portions 251i (at the equal intervals in the circumferential direction) are similar to those of the recessed portions 251f in the valve device 10f of the seventh embodiment. Therefore, the valve device 10i of the tenth embodiment can obtain the substantially same advantages to those of the valve device 10f of the seventh embodiment.

Eleventh Embodiment

A valve device 10j of an eleventh embodiment will be explained with reference to FIGS. 26 and 27. The eleventh embodiment is different from the tenth embodiment (FIGS. 24 and 25) in that the valve member 20i of the tenth embodiment is replaced by a valve member 20j.

Figure 26:
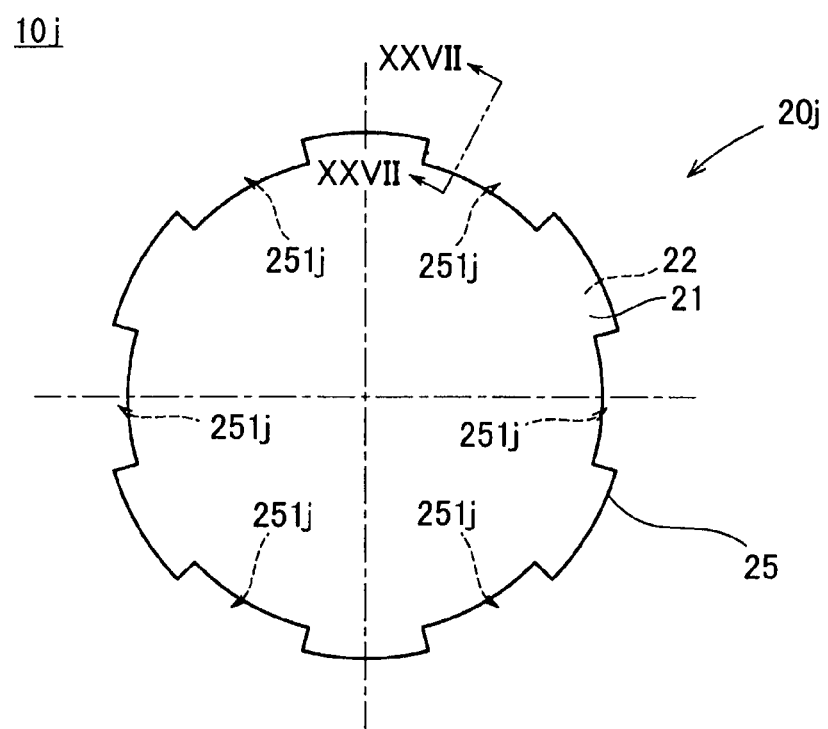
FIG. 26 is a schematic front view of a valve member according to an eleventh embodiment of the present disclosure.
Figure 27:
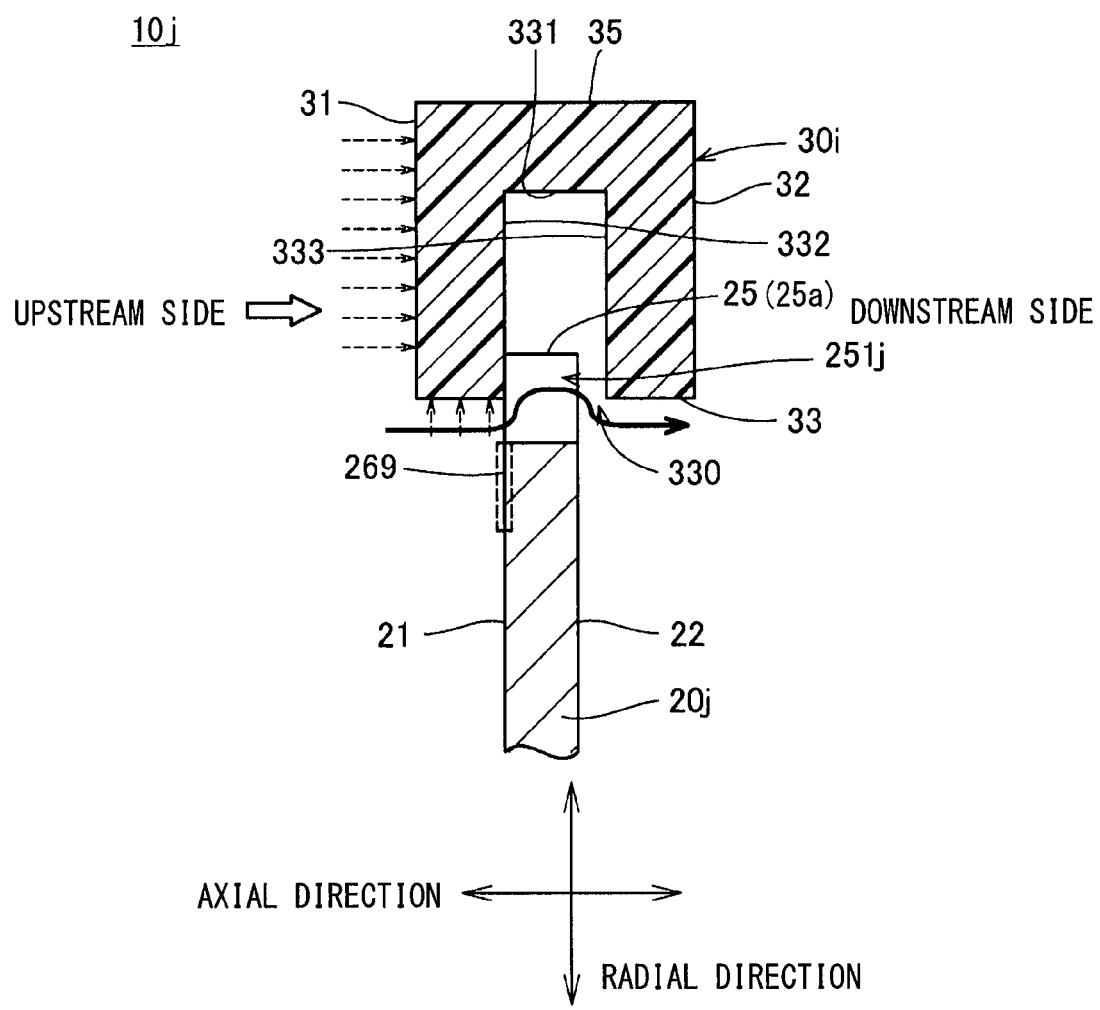
FIG. 27 is a schematic cross-sectional view taken along a line XXVII-XXVII in FIG. 26 for explaining an operation of the seal ring and the valve member of the eleventh embodiment, when the valve member is in its valve opened position.

As shown in FIGS. 26 and 27, multiple cut-out portions 251j are formed at the outer peripheral portion 25 of the valve member 20j, instead of the recessed portions 251i of the tenth embodiment. Each of the cut-out portions 251j penetrates the valve member 20j in the axial direction. In addition, each of the cut-out portions 251j is recessed in the radial-inside direction from the outer peripheral surface 25a of the outer peripheral portion 25. The cut-out portion 251j corresponds to the fluid escape portion.

FIG. 27 is a cross-sectional view taken along a line XXVII-XXVII in FIG. 26 and shows the seal ring 30i and a part of the valve member 20j including the outer peripheral portion 25 thereof.

As shown in FIG. 27, in the valve member 20j having the cut-out portions 251j, the fluid can flow from the upstream side to the downstream side through the cut-out portions 251j formed in the valve member 20j before the seal ring 30i comes out from the valve member 20j, when the valve member 20j is moved to the valve opened position. As a result, it is possible to prevent the seal ring 30i from coming out from the valve member 20j, in the same manner to the valve device 10i of the tenth embodiment having the seal ring 30i. Since the cut-out portion 251j has a structure, in which the fluid can more easily flow from the upstream side to the downstream side than the recessed portion 251i of the tenth embodiment, it is possible to more effectively decrease the fluid pressure which is applied to the inner peripheral portion 33 of the seal ring 30i in the radial-outward direction.

In the valve device 10j of the eleventh embodiment, the location of the cut-out portions 251j (at the radial-outside position of the axial-side sealing surface portion 269) and the arrangement of the cut-out portions 251j (at the equal intervals in the circumferential direction) are the same to those of the recessed portions 251i in the valve device 10i of the tenth embodiment. Therefore, the valve device 10j of the eleventh embodiment can obtain the substantially same advantages to those of the valve device 10i of the tenth embodiment.

Twelfth Embodiment

A valve device 10k of a twelfth eleventh embodiment will be explained with reference to FIGS. 28 and 29. The twelfth embodiment is different from the tenth embodiment (FIGS. 24 and 25) in that the valve member 20i of the tenth embodiment is replaced by a valve member 20k.

Figure 28:
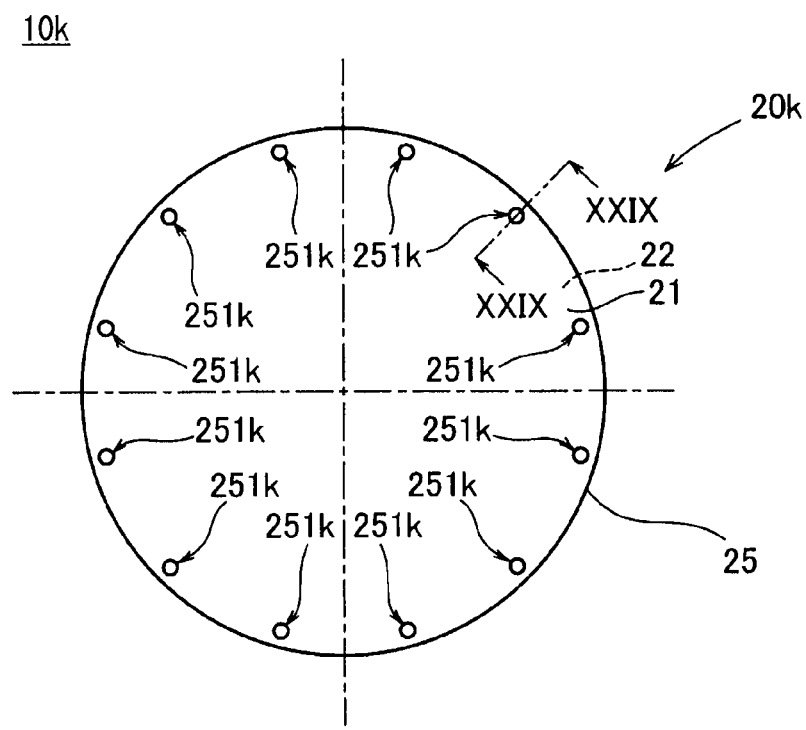
FIG. 28 is a schematic front view of a valve member according to a twelfth embodiment of the present disclosure.
Figure 29:
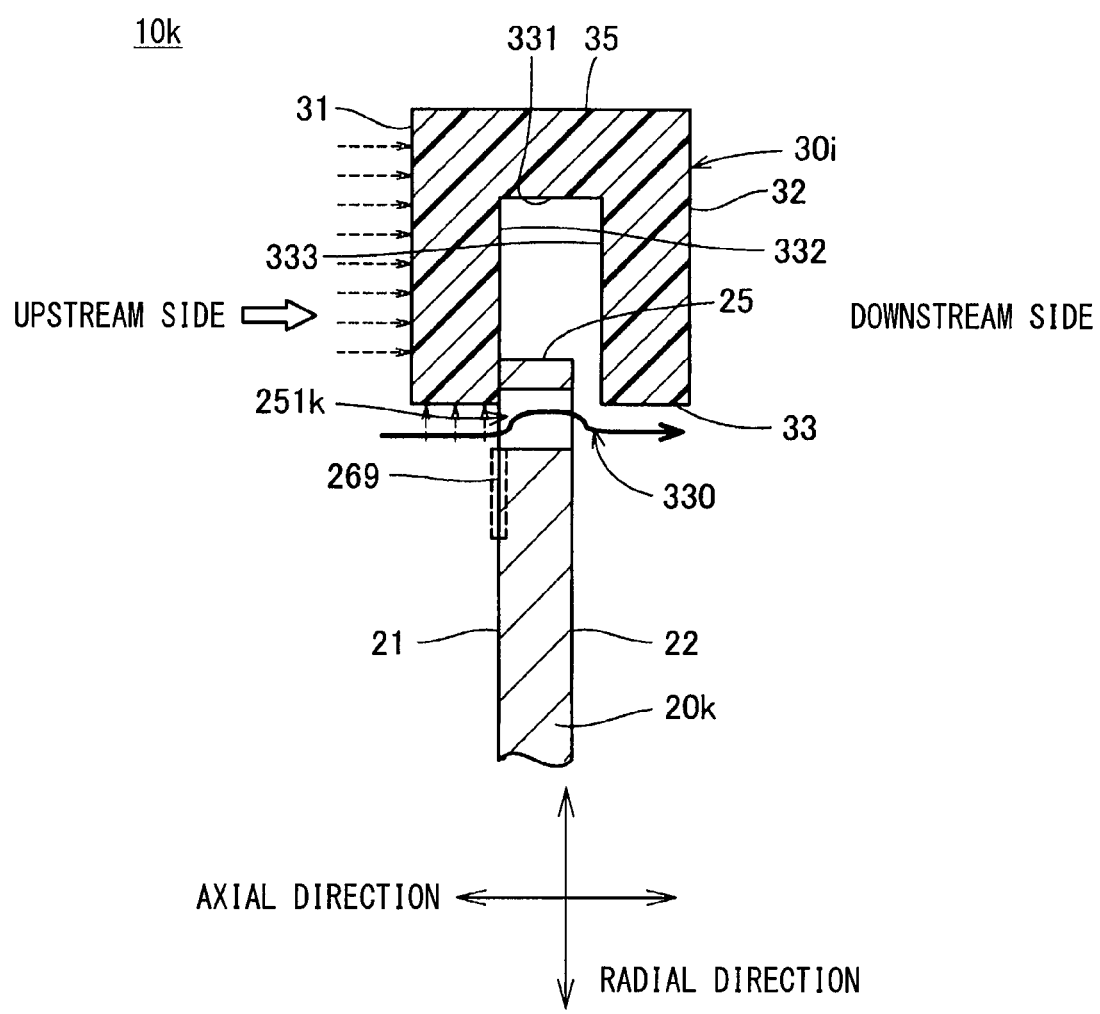
FIG. 29 is a schematic cross-sectional view taken along a line XXIX-XXIX in FIG. 28 for explaining an operation of the seal ring and the valve member of the twelfth embodiment, when the valve member is in its valve opened position.

As shown in FIGS. 28 and 29, multiple through-hole portions 251k are formed at the outer peripheral portion 25 of the valve member 20k, instead of the recessed portions 251i of the tenth embodiment. Each of the through-hole portions 251k penetrates the valve member 20k in the axial direction. The through-hole portion 251k corresponds to the fluid escape portion.

FIG. 29 is a cross-sectional view taken along a line XXIX-XXIX in FIG. 28 and shows the seal ring 30i and a part of the valve member 20k including the outer peripheral portion 25 thereof.

As shown in FIG. 29, in the valve member 20k having the through-hole portions 251k, the fluid can flow from the upstream side to the downstream side through the through-hole portions 251k formed in the valve member 20k before the seal ring 30i comes out from the valve member 20k, when the valve member 20k is moved to the valve opened position. As a result, it is possible to prevent the seal ring 30i from coming out from the valve member 20k, in the same manner to the valve device 10i of the tenth embodiment having the seal ring 30i. Since the through-out portion 251k has a structure, in which the fluid can more easily flow from the upstream side to the downstream side than the recessed portion 251i of the tenth embodiment, it is possible to more effectively decrease the fluid pressure which is applied to the inner peripheral portion 33 of the seal ring 30i in the radial-outward direction.

In the valve device 10k of the twelfth embodiment, the location of the through-hole portions 251k (at the radial-outside position of the axial-side sealing surface portion 269) and the arrangement of the through-hole portions 251k (at the equal intervals in the circumferential direction) are the same to those of the recessed portions 251i in the valve device 10i of the tenth embodiment. Therefore, the valve device 10k of the twelfth embodiment can obtain the substantially same advantages to those of the valve device 10i of the tenth embodiment.

Further Embodiments and/or Modifications (M1) The seal ring is made of the resin in the above embodiments. However, the seal ring may be made of metal, such as, SUS (Stainless steel), aluminum alloy and so on.

(M2) In the above embodiments, for example, in the fitting portion 36 shown in FIG. 4, the projecting portion 361 projecting from one of the circumferential ends 36a to the other circumferential end 36b and the accommodation space 362 for receiving the projecting portion 361 of the other circumferential end 36b are formed, so that the circumferential ends 36a and 36b overlap with each other in the axial direction and in the radial direction. However, the seal ring may be made in such a ring shape having a fitting portion which does not have the projecting portion and the accommodation space.

In addition, in each of the seal rings 30c to 30e of the fourth to the sixth embodiments or in each of the seal rings 30i of the tenth to the twelfth embodiments, it is not always necessary to provide the fitting portion.

(M3) In the above embodiments, the multiple fluid escape portions are arranged at equal intervals in the circumferential direction. A number of the fluid escape portions is not limited to the number (for example, 6 or 12) shown in each of the embodiments, but one or more than one fluid escape portion may be formed. It is preferable that the fluid escape portions are located at the circumferential-outside position of the fitting portion in the circumferential direction, as explained in the first embodiment. On the other hand, it is preferable that one of the fluid escape portions closest to the fitting portion may be located at the position not only outside of the fitting portion but also closer to the fitting portion in the circumferential direction. For example, it is preferable that the fluid escape portions are located at the positions in the angular range of 90 degrees in both circumferential directions from the reference line connecting the center axis of the valve member (or the seal ring) to the fitting portion. It is more preferable that the fluid escape portions are located at the circumferential-outside positions of the fitting portion in the circumferential direction but in the angular range of 45 degrees in both circumferential directions from the reference line connecting the center axis to the fitting portion. It is further preferable that the fluid escape portions are located at the circumferential-outside positions of the fitting portion in the circumferential direction but in the angular range of 30 degrees in both circumferential directions from the reference line connecting the center axis to the fitting portion.

(M4) In the above embodiments, the valve device is applied to the EGR apparatus. However, the valve device of the present disclosure can be applied to a valve device of any other type for opening and closing a fluid passage.

The present disclosure is not limited to the above embodiments and/or modifications but can be further modified in various manners without departing from a spirit of the present disclosure.

What is claimed is:

1. A valve device comprising;
    a valve member movably accommodated in a fluid passage for opening and closing the fluid passage;
    a seal ring provided at an outer peripheral portion of the valve member for sealing a gap between the valve member and the fluid passage when the valve member is moved to a valve closed position;
    a valve-side annular groove formed at the outer peripheral portion of the valve member and extending in a circumferential direction entirely along the outer peripheral portion, so that an inner peripheral portion of the seal ring is movably inserted into the valve-side annular groove in a radial-inward direction;
    a sealing surface portion formed on a downstream-side ring surface of the seal ring, the sealing surface portion being tightly in contact with a downstream-side groove surface of the valve-side annular groove when the valve member is moved to the valve closed position; and
    a fluid escape portion formed in the inner peripheral portion of the seal ring at a radial-inside position of the sealing surface portion,
    wherein the fluid escape portion is entirely located in a space of the valve-side annular groove when the valve member is in the valve closed position, and
    at least a portion of the fluid escape portion is located radially outside of the outer peripheral portion of the valve member and the valve-side annular groove when the valve member is in a valve opened position, so that fluid flows from an upstream side to a downstream side of the valve member through the fluid escape portion when the valve member is moved to the valve opened position.

2. The valve device according to claim 1, wherein the fluid escape portion, which is formed in the seal ring, is composed of a recessed portion recessed in an axial direction of the seal ring and recessed in a radial-outward direction from an inner peripheral surface of an inner peripheral portion of the seal ring.

3. The valve device according to claim 1, wherein the fluid escape portion, which is formed in the seal ring, is composed of a cut-out portion recessed in a radial-outward direction from an inner peripheral surface of an inner peripheral portion of the seal ring and penetrating the seal ring in an axial direction of the seal ring.

4. The valve device according to claim 1, wherein the fluid escape portion, which is formed in the seal ring, is composed of a through-hole portion penetrating the seal ring in an axial direction of the seal ring.

5. The valve device according to claim 1, wherein the seal ring has a fitting portion, at which each of circumferential ends is capable of being separated from each other in a circumferential direction of the seal ring so that the seal ring is expanded in a radial-outward direction, and
    the fluid escape portion, which is formed in the seal ring, is offset from the fitting portion in the circumferential direction but located 90 degrees from a reference line connecting a center axis of the seal ring to the fitting portion.

6. The valve device according to claim 1, wherein multiple fluid escape portions are formed in the seal ring and arranged in a circumferential direction.

7. The valve device according to claim 6, wherein the multiple fluid escape portions are arranged at equal intervals in the circumferential direction.

8. The valve device according to claim 1, wherein the seal ring is made of resin.

9. A valve device comprising;
    a valve member movably accommodated in a fluid passage for opening and closing the fluid passage;
    a seal ring provided at an outer peripheral portion of the valve member for sealing a gap between the valve member and the fluid passage when the valve member is moved to a valve closed position;
    a valve-side annular groove formed at the outer peripheral portion of the valve member and extending in a circumferential direction entirely along the outer peripheral portion, so that an inner peripheral portion of the seal ring is movably inserted into the valve-side annular groove in a radial-inward direction;
    a sealing surface portion formed on a downstream-side ring surface of the seal ring, the sealing surface portion being tightly in contact with a downstream-side groove surface of the valve-side annular groove when the valve member is moved to the valve closed position; and
    a fluid escape portion formed in the inner peripheral portion of the seal ring at a radial-inside position of the sealing surface portion,
    wherein the fluid escape portion is entirely located in a space of the valve-side annular groove when the valve member is in the valve closed position, and
    at least a portion of the fluid escape portion is located radially outside of the outer peripheral portion of the valve member and the valve-side annular groove when the valve member is in a valve fully-opened position, so that fluid flows from an upstream side to a downstream side of the valve member through the fluid escape portion when the valve member is in the valve fully-opened position, to thereby decrease pressure difference between the inner peripheral portion of the seal ring and an outer peripheral portion of the seal ring.

* * * * *